(12) United States Patent
Charlton et al.

(10) Patent No.: US 11,015,383 B2
(45) Date of Patent: May 25, 2021

(54) MODULAR DOOR LITE COMPONENTS

(71) Applicants: Thomas Jesse Charlton, Renton, WA (US); Frank Ross Murray, Bellevue, WA (US)

(72) Inventors: Thomas Jesse Charlton, Renton, WA (US); Frank Ross Murray, Bellevue, WA (US)

( * ) Notice: Subject to any disclaimer, the term of this patent is extended or adjusted under 35 U.S.C. 154(b) by 503 days.

(21) Appl. No.: 15/483,800

(22) Filed: Apr. 10, 2017

(65) Prior Publication Data

US 2017/0370147 A1 Dec. 28, 2017

Related U.S. Application Data

(63) Continuation of application No. 14/643,861, filed on Mar. 10, 2015, now Pat. No. 9,617,779.

(60) Provisional application No. 61/967,089, filed on Mar. 10, 2014, provisional application No. 62/101,839, filed on Jan. 9, 2015.

(51) Int. Cl.
*B29C 45/00* (2006.01)
*E06B 3/58* (2006.01)
*E06B 1/36* (2006.01)
*B29L 31/00* (2006.01)
*B29L 31/10* (2006.01)

(52) U.S. Cl.
CPC .......... *E06B 3/5892* (2013.01); *B29C 45/006* (2013.01); *E06B 1/36* (2013.01); *B29L 2031/10* (2013.01); *B29L 2031/724* (2013.01); *Y10T 29/49826* (2015.01)

(58) Field of Classification Search
CPC .... B29C 45/26; B29C 45/1744; B29C 45/006
See application file for complete search history.

(56) References Cited

U.S. PATENT DOCUMENTS

| 3,546,841 | A | * | 12/1970 | Randall | ................. E06B 3/7015 156/78 |
| 3,750,358 | A | | 8/1973 | Lewkowitz | |
| 3,760,543 | A | | 9/1973 | McAllister | |
| 3,903,669 | A | | 9/1975 | Pease, Jr. et al. | |
| 4,048,273 | A | * | 9/1977 | Pryce-Jones | ........ B29C 44/1214 264/263 |
| 4,327,535 | A | | 5/1982 | Governale | |
| 4,407,100 | A | * | 10/1983 | Huelsekopf | ............... E06B 1/30 49/504 |
| 5,069,849 | A | * | 12/1991 | Wain | ................. B29C 45/14467 264/148 |
| 5,252,053 | A | * | 10/1993 | Schraven | ................ B29C 45/26 100/258 R |
| 5,283,995 | A | | 2/1994 | Richter | |

(Continued)

*Primary Examiner* — Xiao S Zhao
*Assistant Examiner* — Emmanuel S Luk
(74) *Attorney, Agent, or Firm* — Seed Intellectual Property Law Group LLP

(57) ABSTRACT

Modular components of modular door lite frame systems are disclosed. In some cases, a modular door lite frame system includes matching first and second modular frames, one or more modular male alignment members, and one or more modular female alignment members. In some cases, the modular alignment members can be coupled to modular frames of various sizes. In some cases, the modular components can be formed by casting ABS between no more than two opposed mold portions.

2 Claims, 29 Drawing Sheets

(56) References Cited

U.S. PATENT DOCUMENTS

| | | | | |
|---|---|---|---|---|
| 5,369,922 A * | 12/1994 | Hansen | ...................... | E06B 1/30 |
| | | | | 52/204.54 |
| 5,371,931 A * | 12/1994 | Kawana | .................. | B29C 37/00 |
| | | | | 29/33 K |
| 5,546,285 A * | 8/1996 | Takikawa | ................ | B29C 45/26 |
| | | | | 362/509 |
| 5,566,510 A * | 10/1996 | Hollingshead | .... | B29C 45/14409 |
| | | | | 49/475.1 |
| 5,570,548 A | 11/1996 | Hopper | | |
| 5,644,881 A | 7/1997 | Neilly | | |
| 5,829,937 A * | 11/1998 | Morello | .............. | B60R 13/0206 |
| | | | | 411/510 |
| 6,101,772 A * | 8/2000 | Leonard | ................ | E06B 3/5892 |
| | | | | 52/204.53 |
| 6,272,801 B1 | 8/2001 | Suh | | |
| 6,467,226 B2 | 10/2002 | Dodson et al. | | |
| 6,553,735 B1 * | 4/2003 | Wang Chen | .......... | E06B 3/5892 |
| | | | | 52/204.6 |
| 6,574,935 B2 | 6/2003 | Wang Chen | | |
| 6,694,701 B2 * | 2/2004 | Wang | .................... | E06B 3/5892 |
| | | | | 52/208 |
| 6,922,946 B2 | 8/2005 | Gerard | | |
| 6,925,767 B2 | 8/2005 | Krochmal et al. | | |
| 7,010,888 B2 * | 3/2006 | Tumlin | ................ | E06B 3/5892 |
| | | | | 52/204.56 |
| 7,331,142 B2 | 2/2008 | Gerard | | |
| 7,386,959 B2 | 6/2008 | Ouellette | | |
| 7,513,079 B2 * | 4/2009 | Nozaki | .................... | B60J 10/74 |
| | | | | 264/45.9 |
| 7,797,904 B2 * | 9/2010 | Wang Chen | ............ | E04C 2/427 |
| | | | | 52/592.1 |
| 8,226,178 B2 * | 7/2012 | Kummel | ................ | F25D 23/10 |
| | | | | 312/204 |
| 8,651,924 B1 * | 2/2014 | Jones | ..................... | B64D 13/02 |
| | | | | 244/118.5 |
| 8,707,639 B2 | 4/2014 | Thompson | | |
| 8,813,442 B1 * | 8/2014 | Edwards | ............... | E06B 3/5892 |
| | | | | 52/204.5 |
| 8,904,733 B2 | 12/2014 | Thompson | | |
| 9,038,335 B1 | 5/2015 | Eck et al. | | |
| 9,080,380 B2 | 7/2015 | Thompson | | |
| 2002/0001696 A1 * | 1/2002 | Kozawa | ............ | B29C 45/14409 |
| | | | | 428/156 |
| 2003/0056442 A1 * | 3/2003 | Gerard | .................. | E06B 3/5892 |
| | | | | 49/504 |
| 2004/0006922 A1 * | 1/2004 | Sibbett | ................ | B29C 45/1704 |
| | | | | 49/501 |
| 2004/0188895 A1 * | 9/2004 | Homann | ............. | B29C 45/1705 |
| | | | | 264/572 |
| 2005/0260382 A1 * | 11/2005 | Schoemann | .......... | B29C 45/006 |
| | | | | 428/131 |
| 2006/0101735 A1 * | 5/2006 | Silverman | ......... | B29C 45/14065 |
| | | | | 52/204.1 |
| 2006/0254177 A1 | 11/2006 | Wang et al. | | |
| 2008/0084088 A1 * | 4/2008 | Kubo | .................... | B29C 66/543 |
| | | | | 296/146.9 |
| 2010/0064624 A1 | 3/2010 | Dodd | | |
| 2010/0064625 A1 * | 3/2010 | Charlton | ............... | E06B 3/5892 |
| | | | | 52/656.4 |
| 2010/0199580 A1 * | 8/2010 | Park | ........................ | E06B 5/025 |
| | | | | 52/210 |
| 2012/0128814 A1 * | 5/2012 | Moulin | ................. | B29C 45/006 |
| | | | | 425/588 |
| 2013/0200547 A1 * | 8/2013 | Geibel, Jr. | ............ | B29C 45/006 |
| | | | | 264/250 |
| 2014/0116371 A1 * | 5/2014 | Bruggesser | ........... | B29C 45/006 |
| | | | | 123/184.21 |
| 2015/0252612 A1 | 9/2015 | Charlton et al. | | |
| 2016/0129616 A1 * | 5/2016 | Schad | .................... | B29C 45/12 |
| | | | | 29/428 |

\* cited by examiner

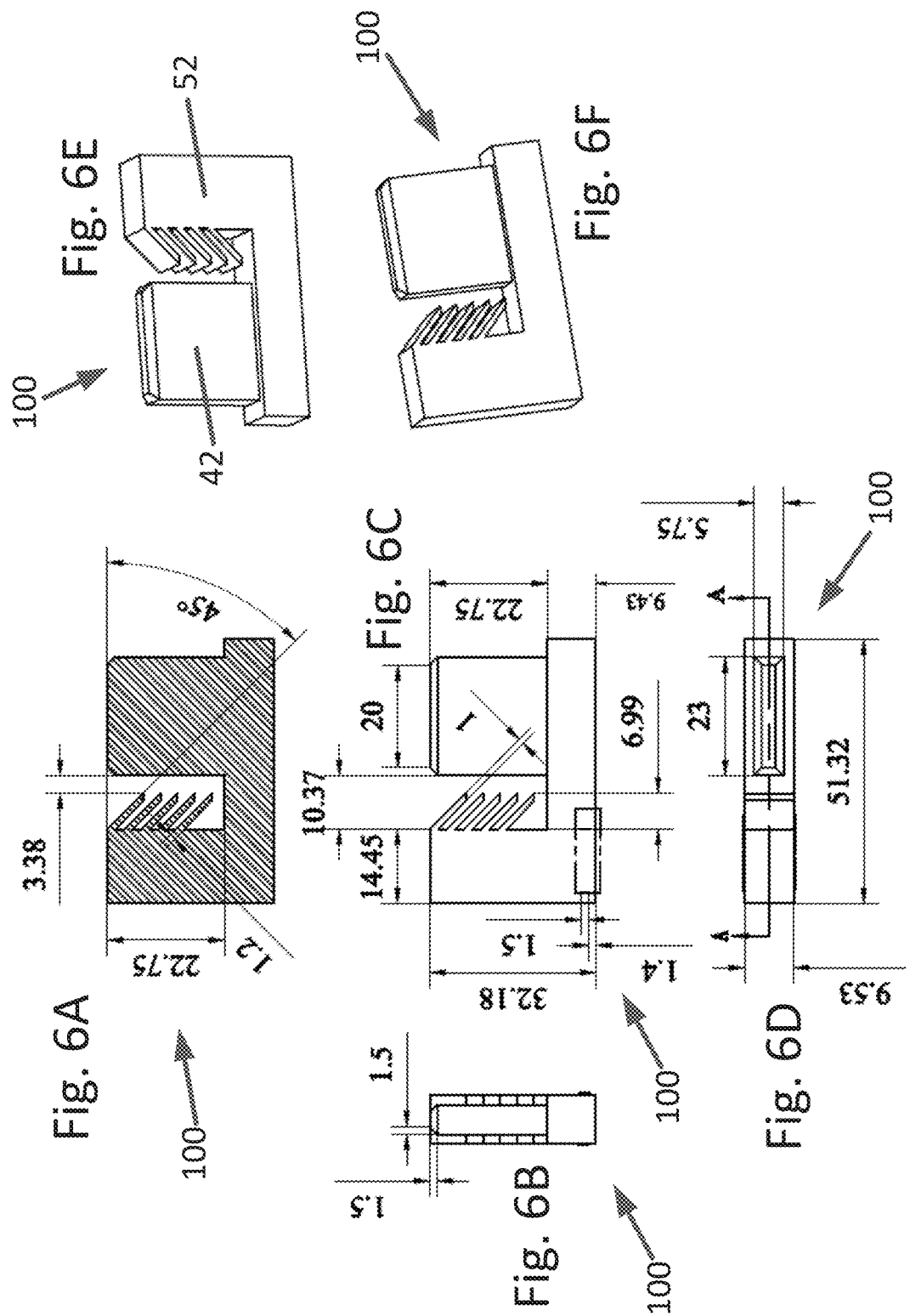

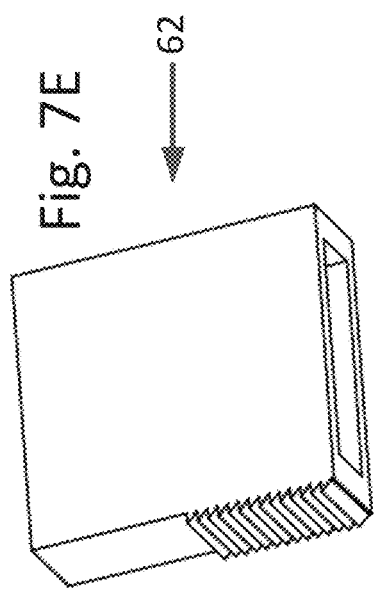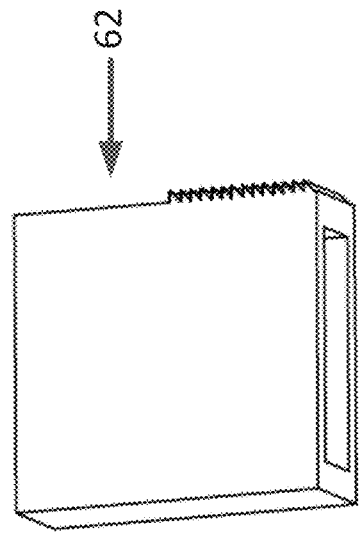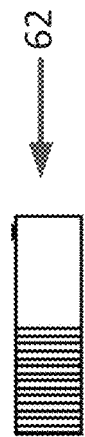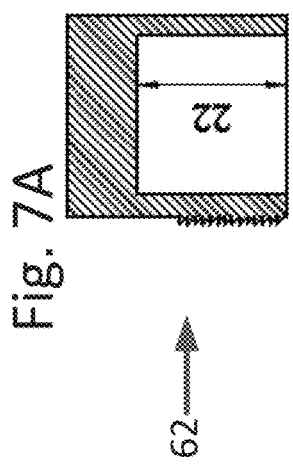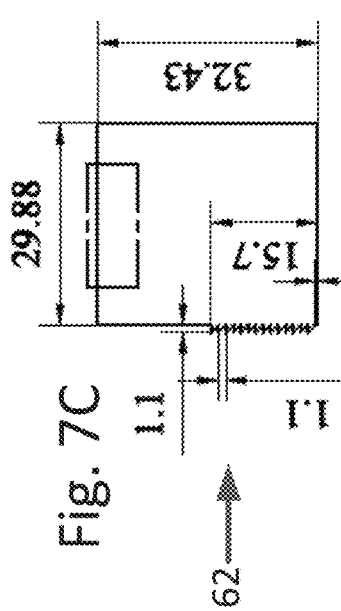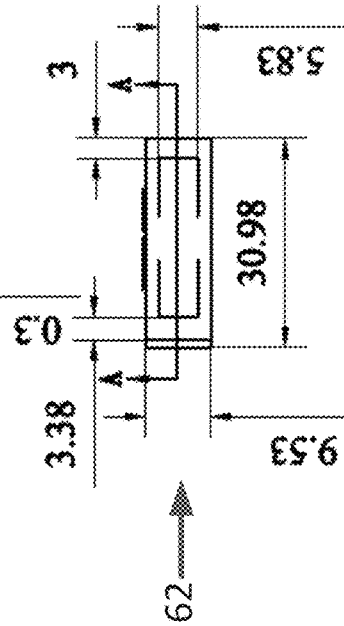

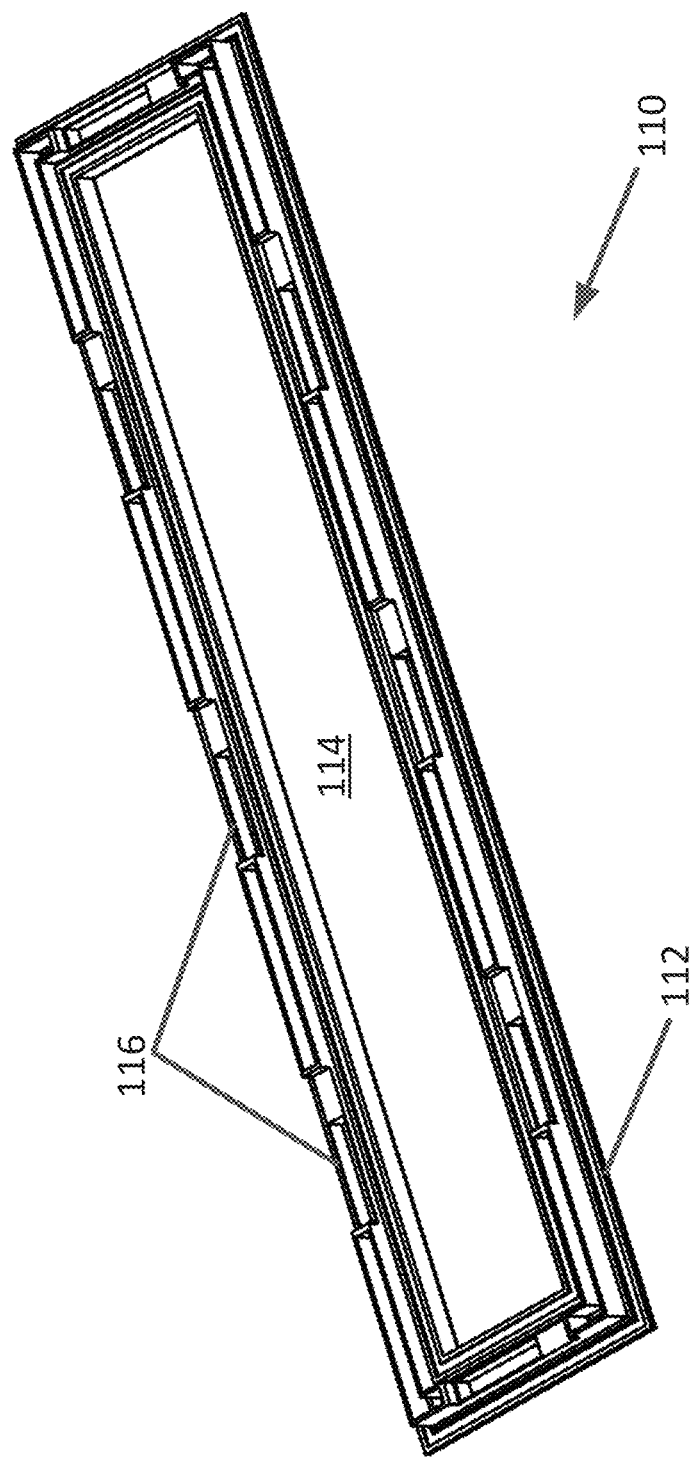

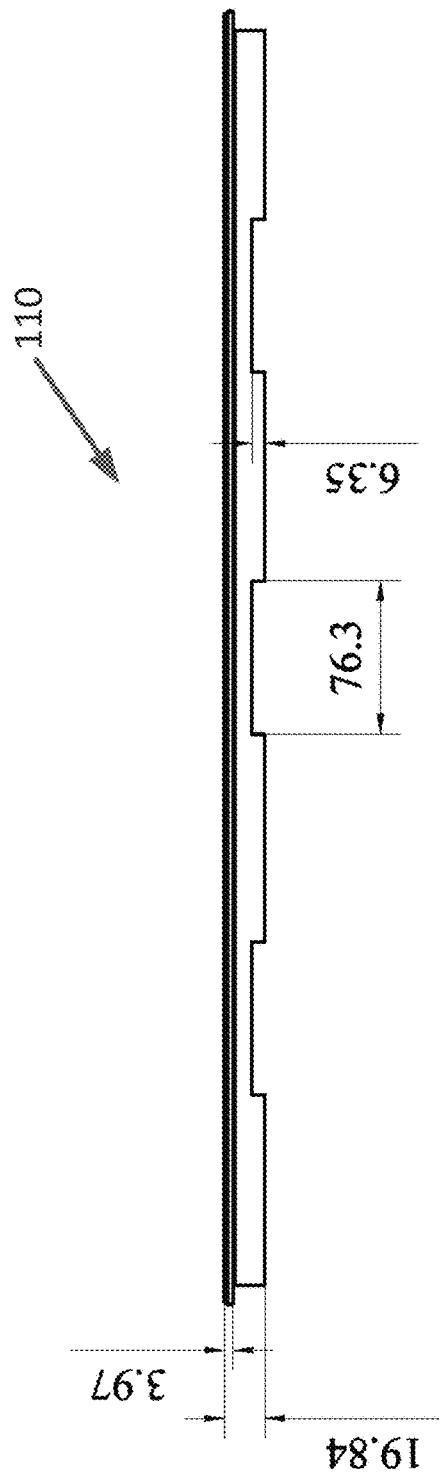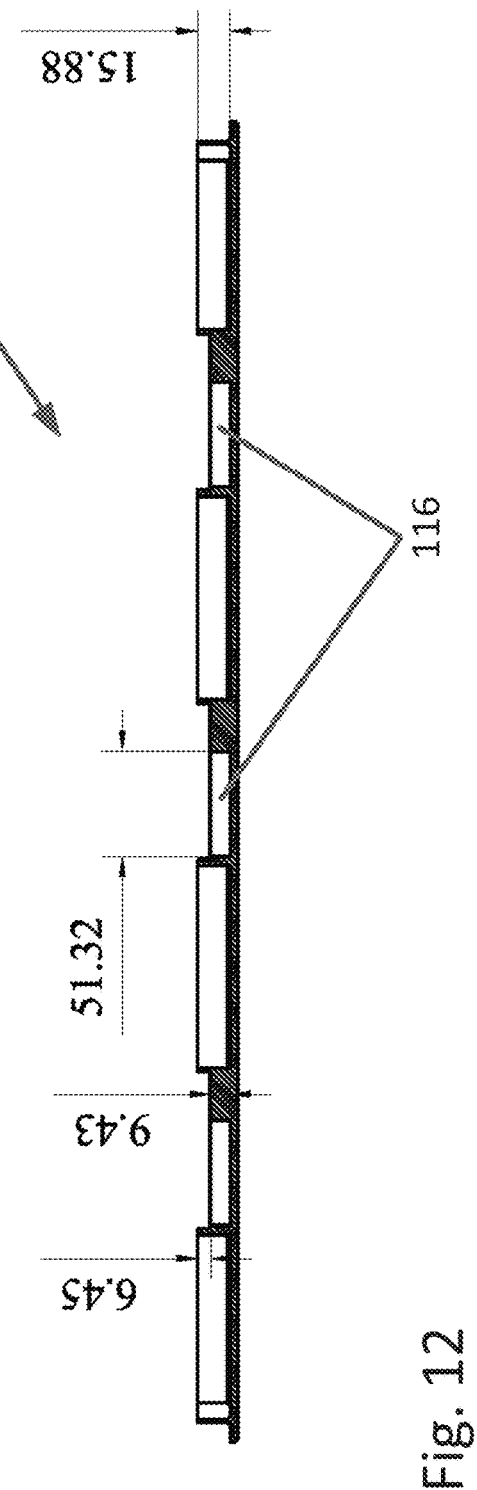

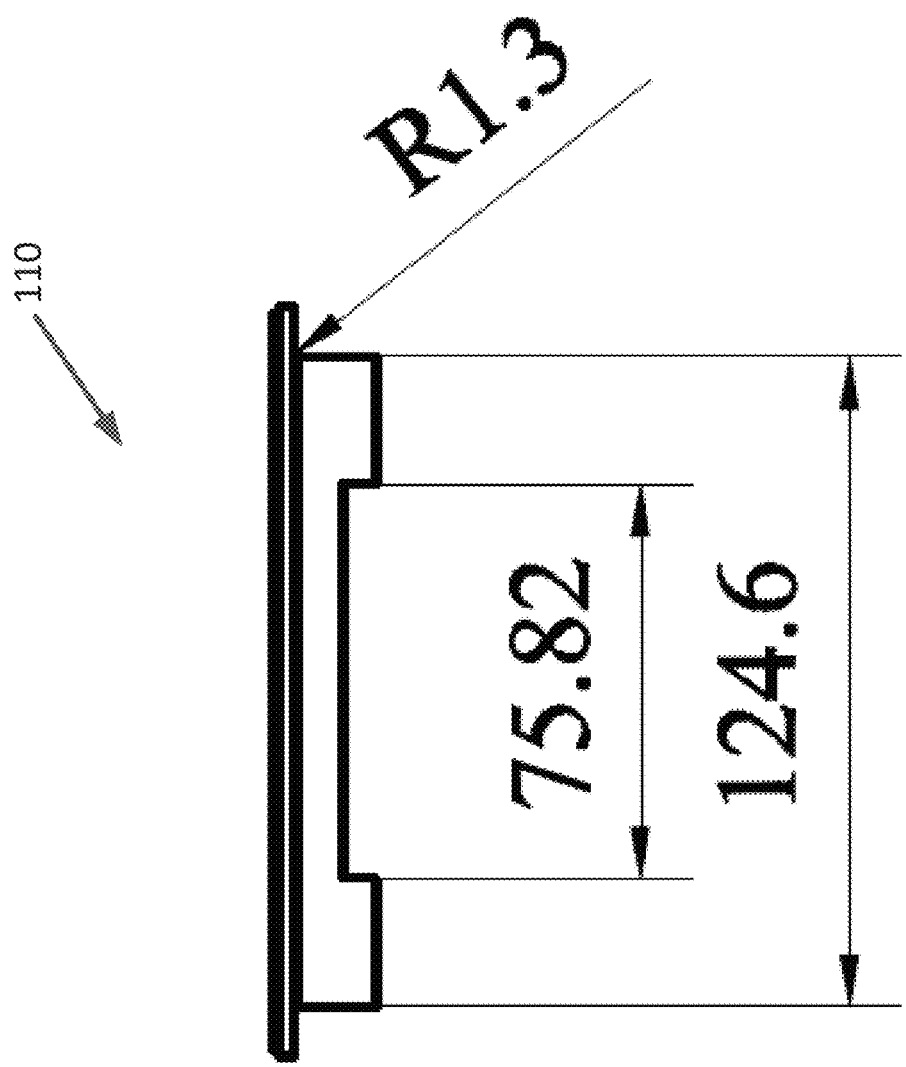

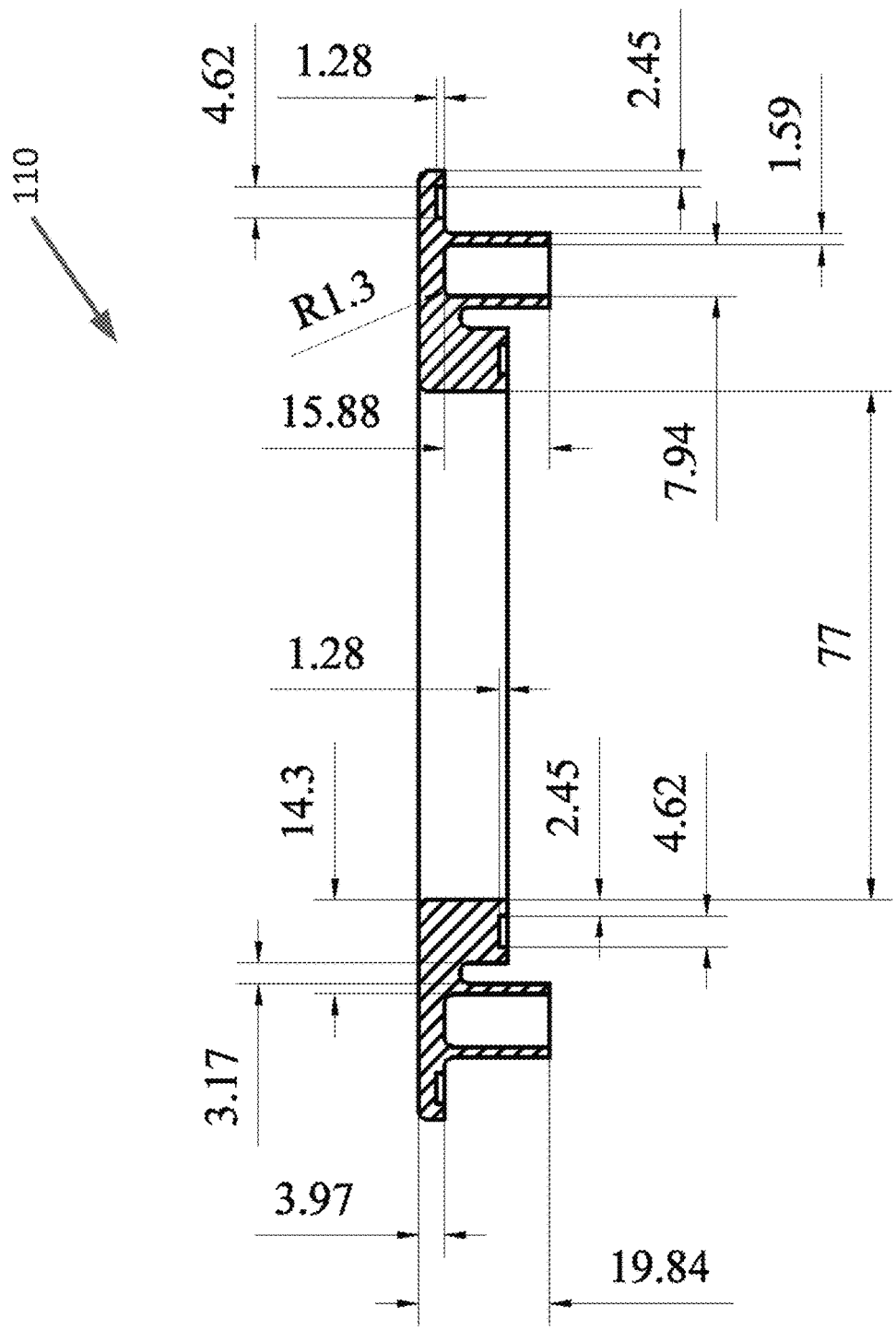

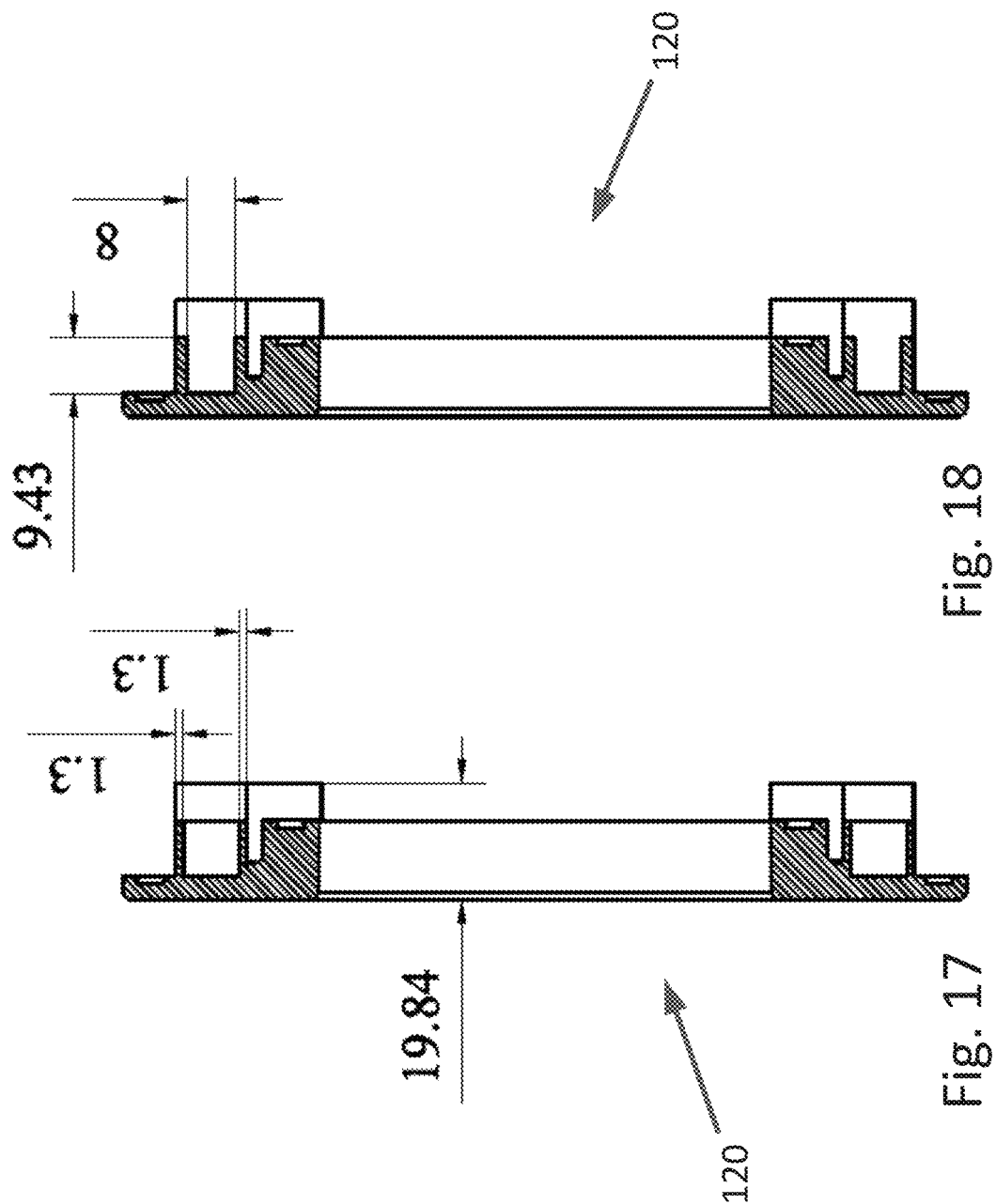

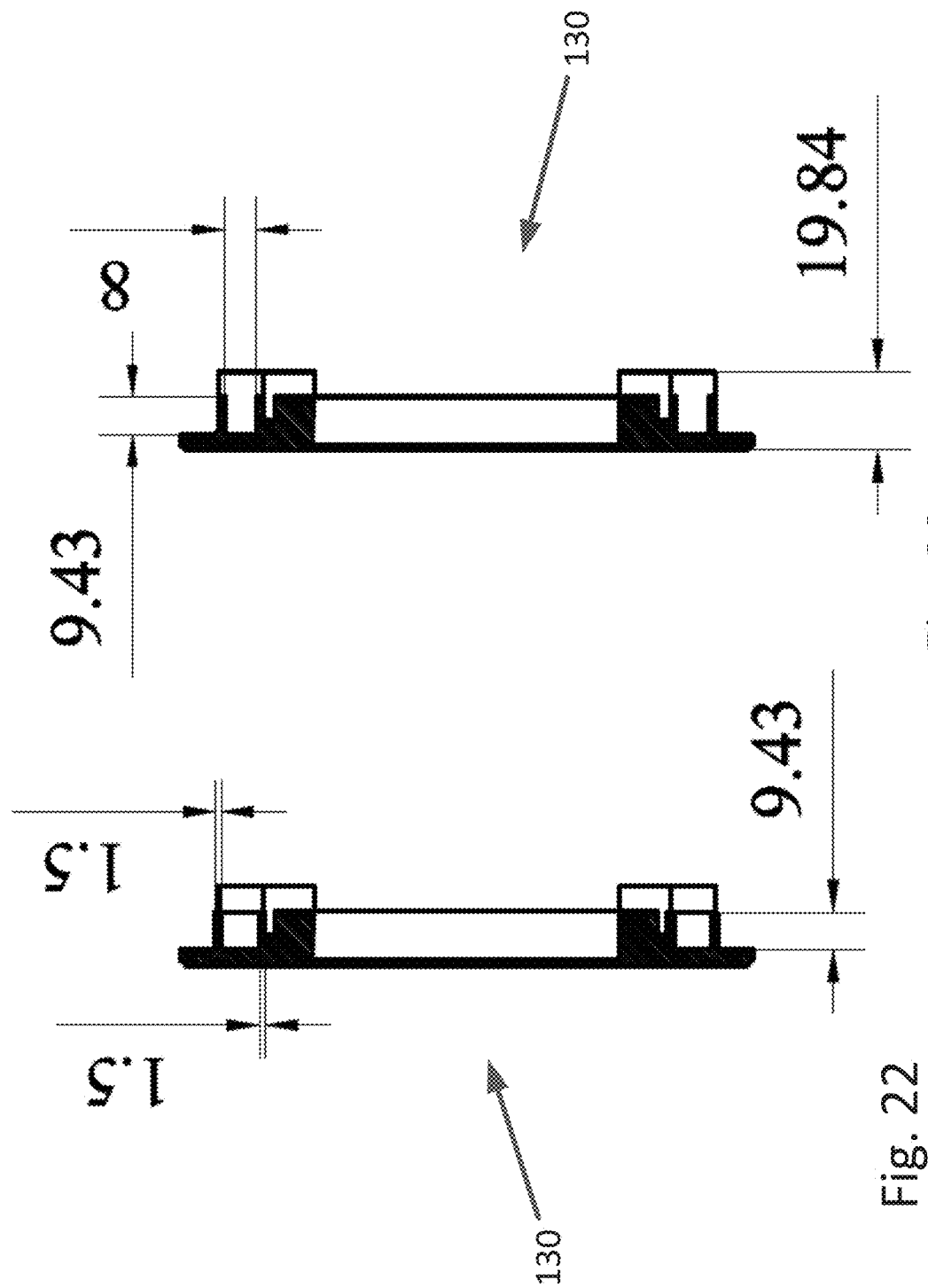

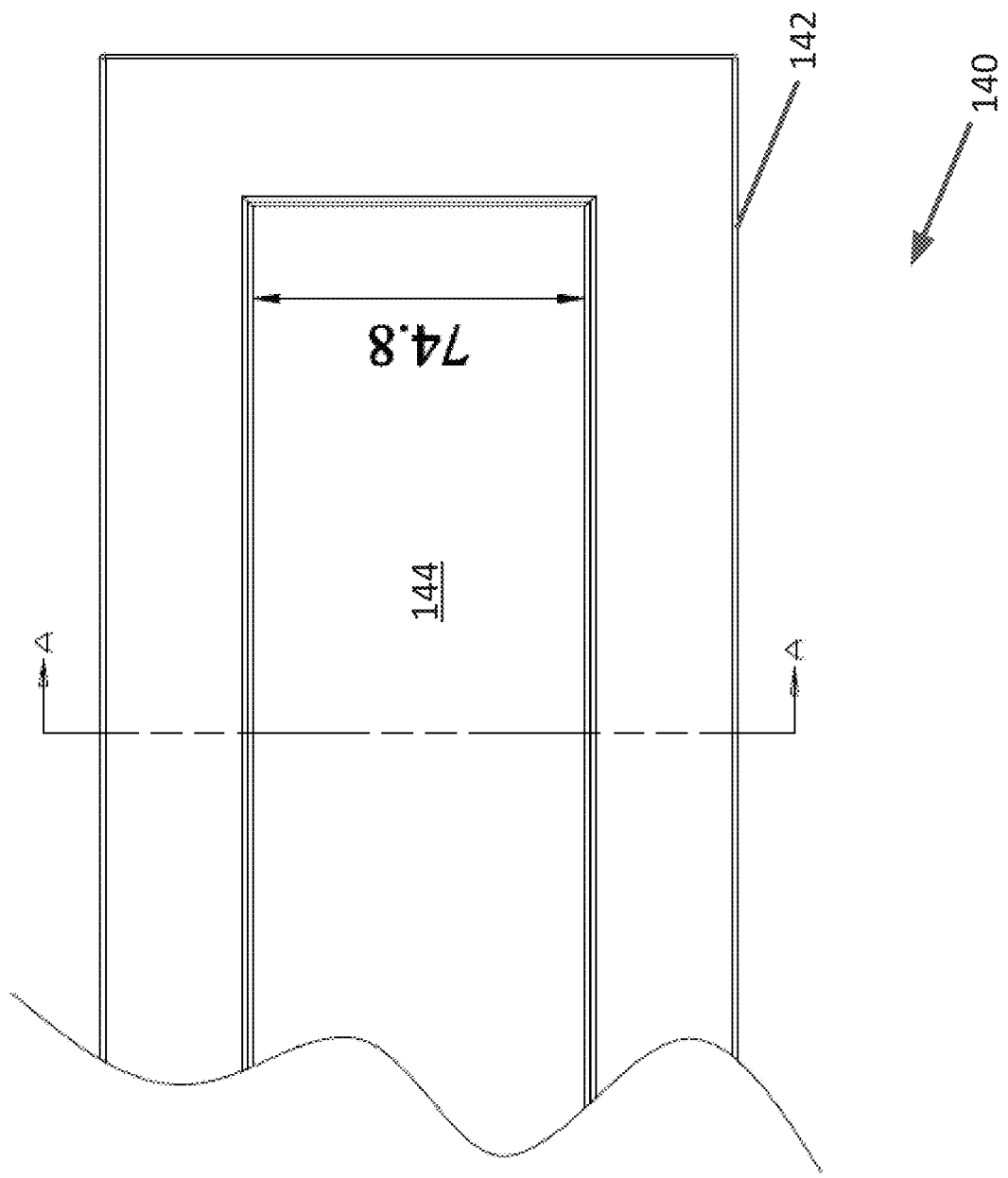

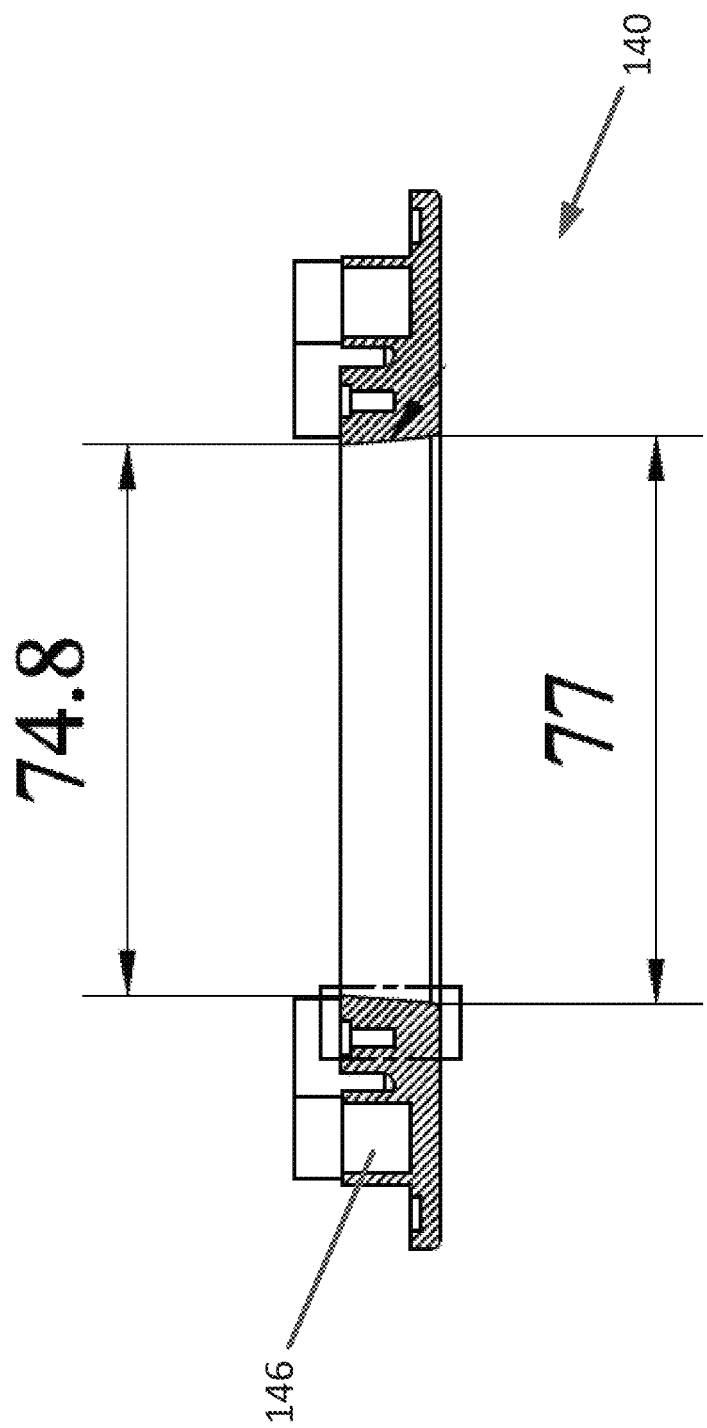

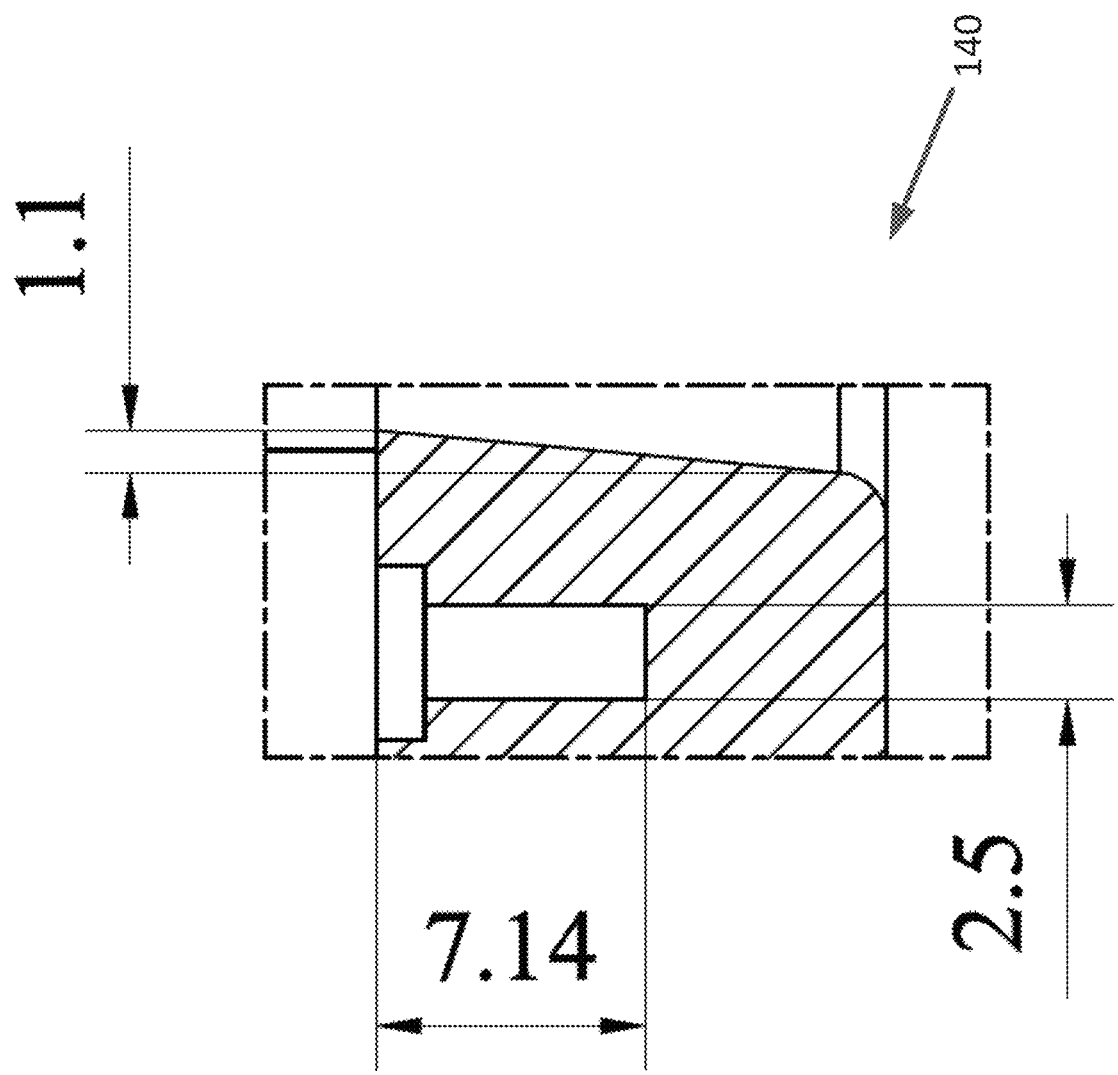

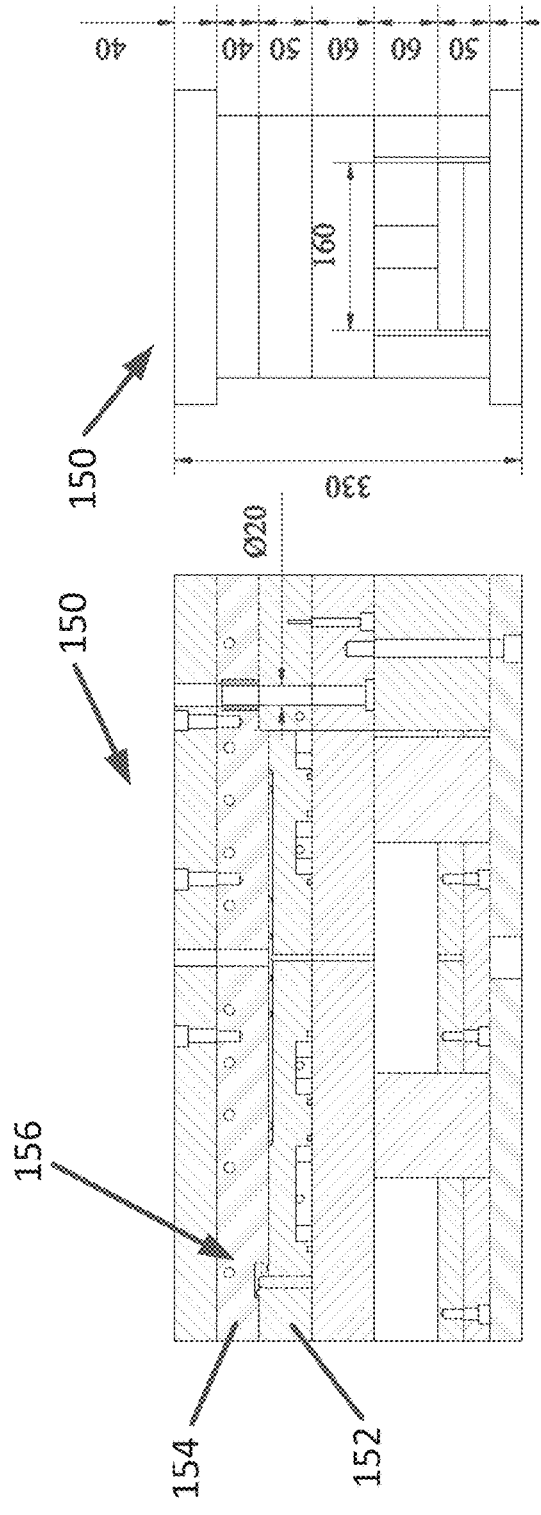
Fig. 28
Fig. 27
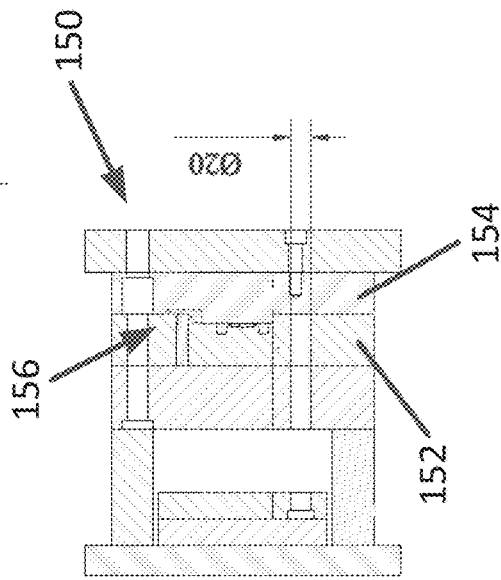
Fig. 29
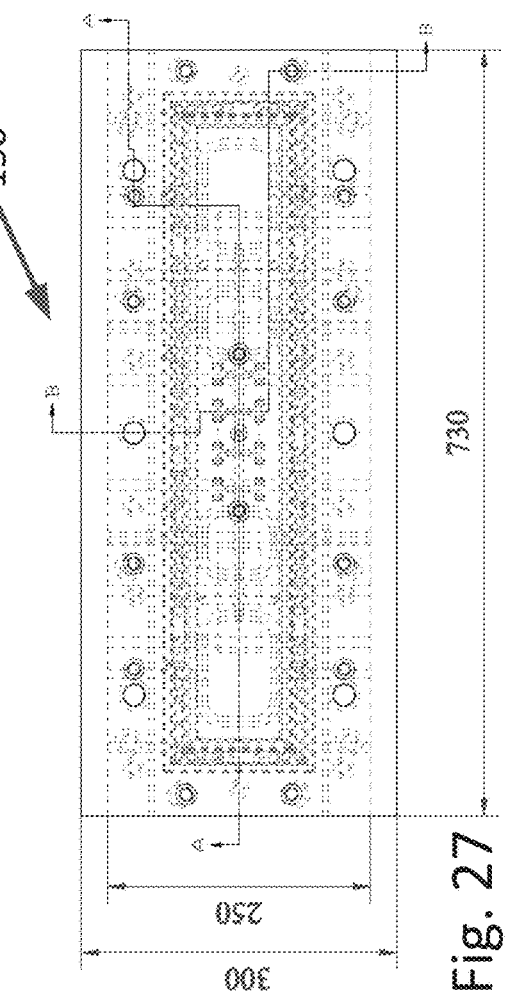
Fig. 30

150

MODULAR DOOR LITE COMPONENTS

BACKGROUND

Technical Field

Modular door lite frame system components and molds for forming such components are disclosed. Molds for forming the components can include at most two opposed mold portions.

Description of the Related Art

Existing frame assemblies for door lites are typically pre-manufactured and shipped to another destination for assembly and installation. For example, door lite frame assemblies can come in two sub-parts, which are secured together with a piece of glass or other transparent or insulating material, such as a glazing panel, between the two sub-parts. There are many existing frame assemblies having different types of external clips or other external fasteners (such as screws) for securing the frame assembly together.

Unfortunately, installation of these existing door lite frames with external fasteners can be time consuming. For example, in some prior door lite frames, when the frame assembly arrives at the place of installation, the frame sub-parts are typically separated by removing fasteners that hold the sub-parts together during transportation. Then during installation, the frame sub-parts are positioned and re-secured together with fasteners. Each fastener that is removed after shipment and re-secured during installation decreases the efficiency of installation, increases costs, and detracts from the aesthetics of the door lite frame.

Door lites without external threaded fasteners have been the subject of U.S. patent applications. For example, U.S. Patent Application Publication No. 2010/0064625 to Charlton et al., the full disclosure of which is hereby incorporated herein by reference in its entirety, describes a door lite frame system. One drawback of such door lite frame systems is that they have been found to be more expensive than desirable to fabricate. There is a need for relatively inexpensive door lite frame systems, components thereof, molds for forming such components, and systems including such components.

BRIEF SUMMARY

In some embodiments, a mold system for casting door lite frame system components comprises a first mold including a first top mold portion and a first bottom mold portion, the first top mold portion and the first bottom mold portion defining a first cavity for casting a first modular frame having a first length, a first width, and a first recess having first recess dimensions, a second mold including a second top mold portion and a second bottom mold portion, the second top mold portion and the second bottom mold portion defining a second cavity for casting a second modular frame having a second length larger than the first length, a second width larger than the first width, and a second recess having second recess dimensions, the second recess dimensions being the same as the first recess dimensions, a third mold including a third top mold portion and a third bottom mold portion, the third top mold portion and the third bottom mold portion defining a third cavity for casting a male alignment member having male alignment member dimensions such that the male alignment member can be seated within the first recess and can be seated within the second recess, and a fourth mold including a fourth top mold portion and a fourth bottom mold portion, the fourth top mold portion and the fourth bottom mold portion defining a fourth cavity for casting a female alignment member having female alignment member dimensions such that the female alignment member can be seated within the first recess and can be seated within the second recess.

In some cases, the third top mold portion and the third bottom mold portion define the third cavity for casting a male interlocking member having a plurality of arms extending therefrom, and the fourth top mold portion and the fourth bottom mold portion define the fourth cavity for casting the female alignment member including a plurality of teeth to engage with the plurality of arms.

In other embodiments, a system of door lite components comprises a first modular frame including a first recess and a second modular frame including a second recess, the first modular frame having dimensions matching those of the second modular frame, the first modular frame and the second modular frame having a first length and a first width, a third modular frame including a third recess and a fourth modular frame including a fourth recess, the third modular frame having dimensions matching those of the fourth modular frame, the third modular frame and the fourth modular frame having a second length larger than the first length and a second width larger than the first width, a first male alignment member and a second male alignment member, the first male alignment member having dimensions matching those of the second male alignment member, a first female alignment member and a second female alignment member, the first female alignment member having dimensions matching those of the second female alignment member, wherein the first male alignment member, the second male alignment member, the first female alignment member, and the second female alignment member are configured to be seated within the first recess, to be seated within the second recess, to be seated within the third recess, and to be seated within the fourth recess.

In some cases, the first male alignment member is seated within the first recess, the second male alignment member is seated within the third recess, the first female alignment member is seated within the second recess, and the second female alignment member is seated within the fourth recess to allow the first modular frame and the first male alignment member to mate in a shipping arrangement with the second modular frame and the first female alignment member, to allow the first modular frame and the first male alignment member to mate in an installed arrangement with the second modular frame and the first female alignment member, to allow the third modular frame and the second male alignment member to mate in a shipping arrangement with the fourth modular frame and the second female alignment member, and to allow the third modular frame and the second male alignment member to mate in an installed arrangement with the fourth modular frame and the second female alignment member.

In other embodiments, a method of forming door lite frame systems comprises casting a first modular frame between a first top mold portion and a first bottom mold portion, the first modular frame having a first length, a first width and a first recess, casting a second modular frame between the first top mold portion and the first bottom mold portion, the second modular frame having a second recess and dimensions matching those of the first modular frame, casting a third modular frame between a second top mold portion and a second bottom mold portion, the third modular frame having a second length larger than the first length, a second width larger than the first width, and a third recess, casting a fourth modular frame between the second top mold portion and the second bottom mold portion, the fourth modular frame having a fourth recess and dimensions matching those of the third modular frame, seating a first male alignment member within the first recess, a first female alignment member within the second recess, a second male alignment member within the third recess, and a second female alignment member within the fourth recess, the first male alignment member having dimensions matching those of the second male alignment member and the first female alignment member having dimensions matching those of the second female alignment member, mating the first modular frame and the first male alignment member with the second modular frame and the first female alignment member in a shipping arrangement, and mating the third modular frame and the second male alignment member with the fourth modular frame and the second female alignment member in a shipping arrangement.

In some cases, seating the first male alignment member within the first recess comprises seating a first male interlocking member including a first plurality of arms within the first recess, seating the second male alignment member within the third recess comprises seating a second male interlocking member including a second plurality of arms within the third recess, seating the first female alignment member within the second recess comprises seating a first female alignment member including a first plurality of teeth within the second recess, seating the second female alignment member within the fourth recess comprises seating a second female alignment member including a second plurality of teeth within the fourth recess, mating the first modular frame and the first male alignment member with the second modular frame and the first female alignment member in a shipping arrangement comprises mating the first modular frame and the first male alignment member with the second modular frame and the first female alignment member such that the first plurality of arms do not engage with the first plurality of teeth, and mating the third modular frame and the second male alignment member with the fourth modular frame and the second female alignment member in a shipping arrangement comprises mating the third modular frame and the second male alignment member with the fourth modular frame and the second female alignment member such that the second plurality of arms do not engage the second plurality of teeth.

BRIEF DESCRIPTION OF THE SEVERAL VIEWS OF THE DRAWINGS

FIGS. 6A-6F, 7A-7F, and 8A-8D illustrate components of a door lite frame system according to at least one illustrated embodiment.

FIGS. 9-15 illustrate a modular frame of a door lite frame system according to at least one illustrated embodiment.

FIGS. 16-18 illustrate a modular frame of a door lite frame system according to at least one illustrated embodiment.

FIGS. 19-23 illustrate a modular frame of a door lite frame system according to at least one illustrated embodiment.

FIGS. 24-26 illustrate a modular frame of a door lite frame system according to at least one illustrated embodiment.

FIGS. 27-32 illustrate a mold system according to at least one illustrated embodiment.

DETAILED DESCRIPTION

Figure 1:
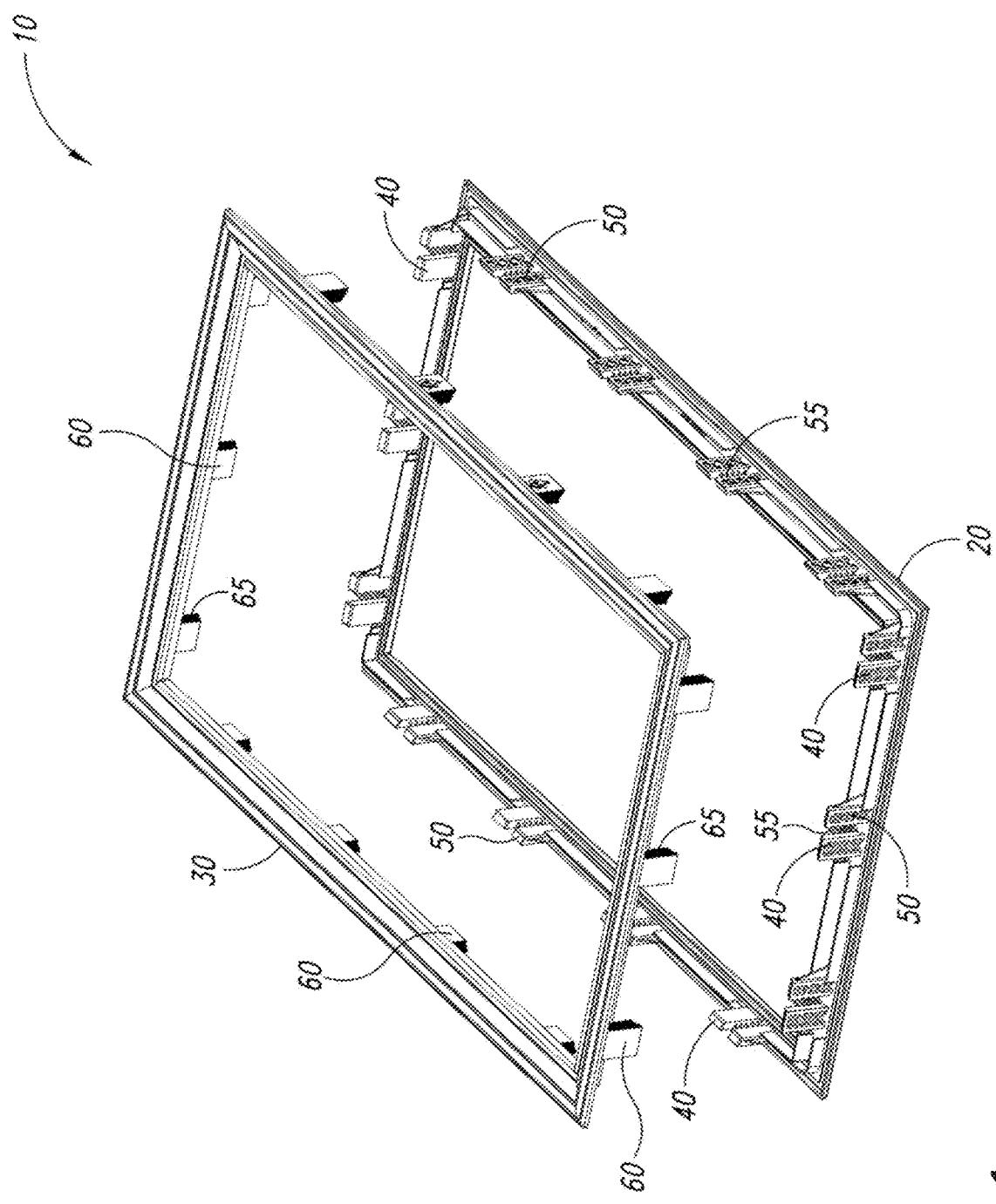
FIGS. 1-5 illustrate components of a door lite frame system according to at least one illustrated embodiment.

FIG. 1 illustrates an example of a door lite frame system 10 including a modular frame 20 and a modular frame 30. The modular frame 20 is coupled to a plurality of male alignment members 40 and a plurality of male interlocking members 50, each adjacent to a respective male alignment member 40. A male alignment member 40 can include a rectangular shaft extending outward from the modular frame 20. A male interlocking member 50 can include a rectangular shaft extending outward from the modular frame 20 and a plurality of arms 55 extending away from the rectangular shaft toward the respective male alignment member 40. A male alignment member 40 and a respective male interlocking member 50 can together be referred to as a male alignment and interlocking member. The modular frame 30 is coupled to a plurality of female alignment members 60, each female alignment member 60 including a plurality of teeth 65 coupled to a first side of a hollow rectangular shaft opposite a second side of the hollow rectangular shaft. In some embodiments, the modular frame 20 can be identical to the modular frame 30, can have dimensions matching those of the modular frame 30, or can be fabricated from the same mold as used to fabricate the modular frame 30.

Figure 2:
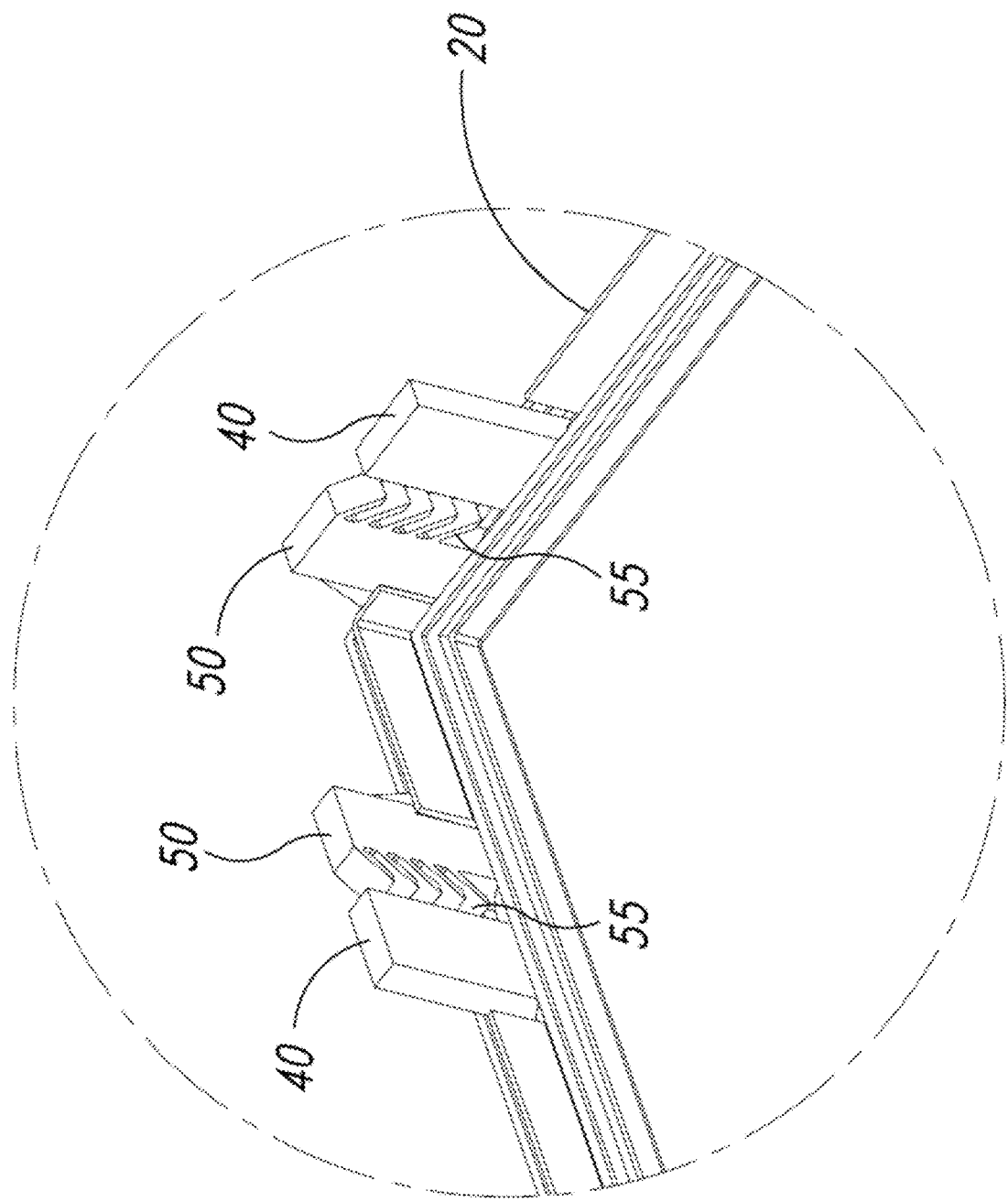
Figure 3:
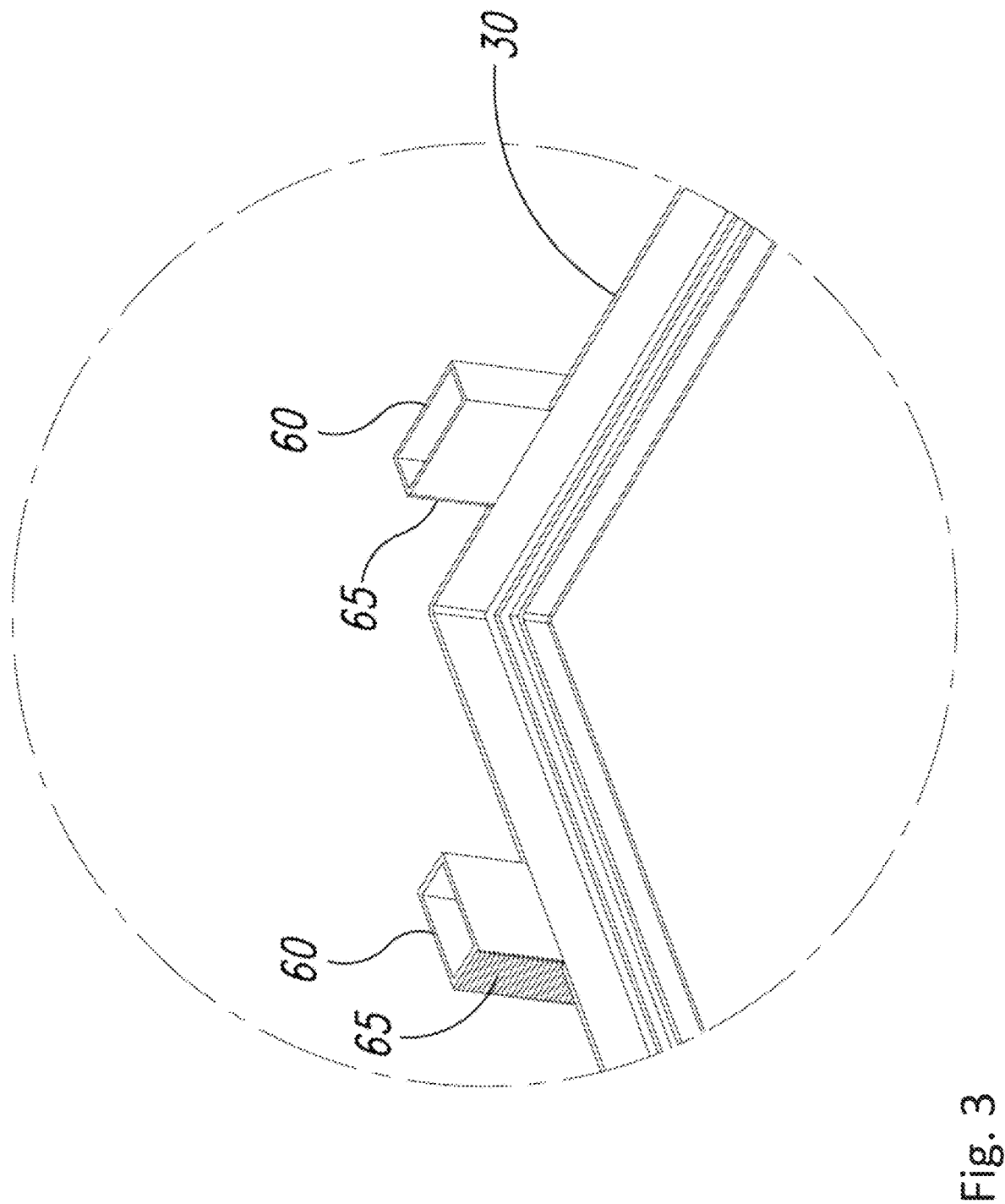

FIG. 2 illustrates a corner portion of the modular frame 20 and two male alignment and interlocking members in greater detail. FIG. 3 illustrates a corner portion of the modular frame 30 and two of the female alignment members 60 in greater detail. The female alignment members 60 can include hollow elements which can be configured to receive respective male alignment members 40 in either one of two different orientations. Further, the male and female alignment members 40, 60, can be positioned around the modular frames 20, 30, respectively, such that as the modular frames 20, 30 are brought toward one another, each male alignment member 40 enters a respective female alignment member 60.

For example, the modular frame 20 can be aligned with the modular frame 30 in a first aligned configuration such that the modular frames 20, 30 can be brought toward one another until the male alignment members 40 enter respective female alignment members 60 such that the arms 55 of each male alignment member 40 are adjacent the second side of a respective female alignment member 60, such that the teeth 65 do not engage the arms 55. Such an arrangement can be referred to as an unlocked, shipping arrangement because the modular frame 20 and the modular frame 30 are not locked to one another and can be pulled laterally apart from one another. In such an arrangement, engagement of the male and female alignment members 40, 60 can align the modular frames 20, 30 with one another, such as during transportation of the frame system 10 to an installation location.

Figure 4:
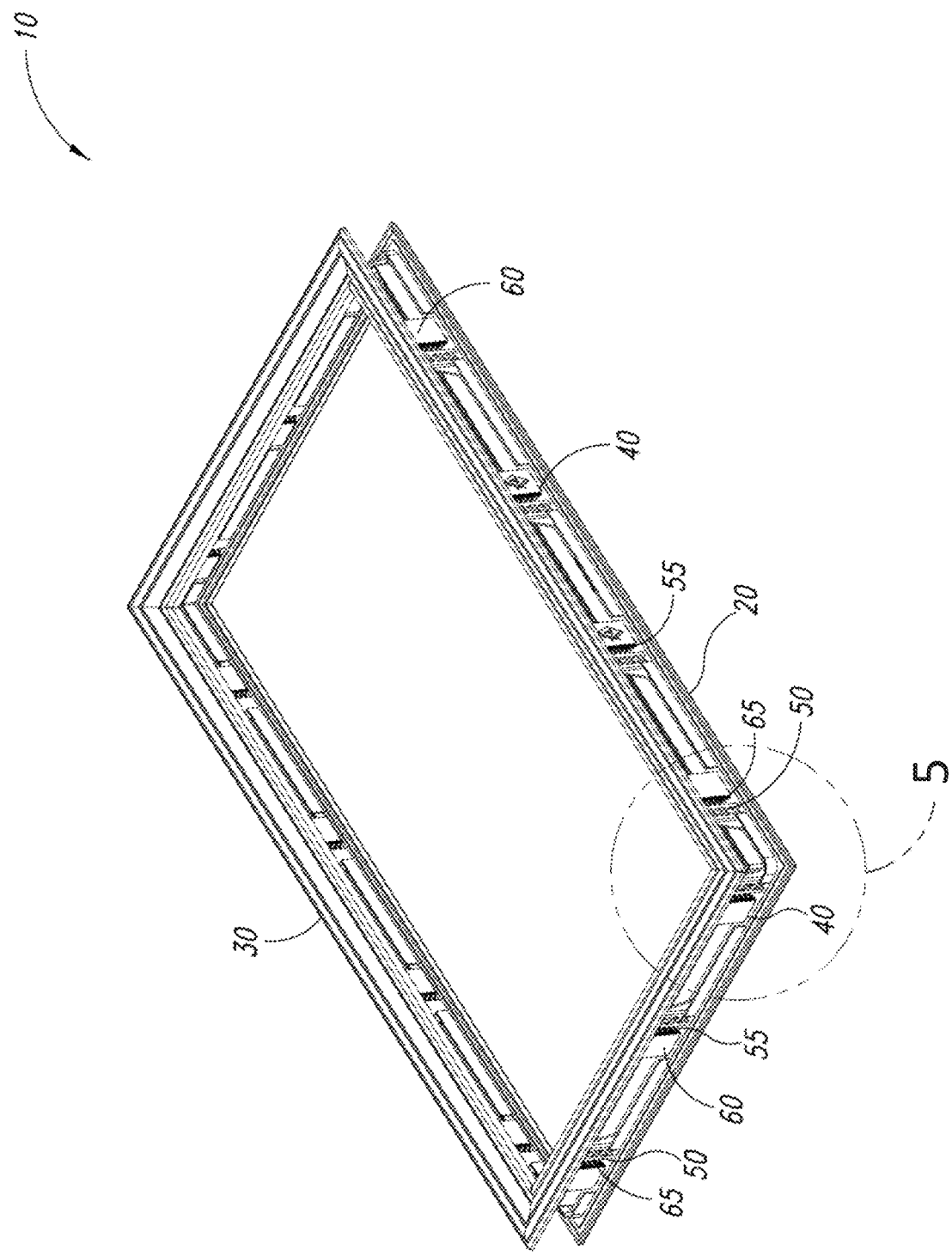
Figure 5:
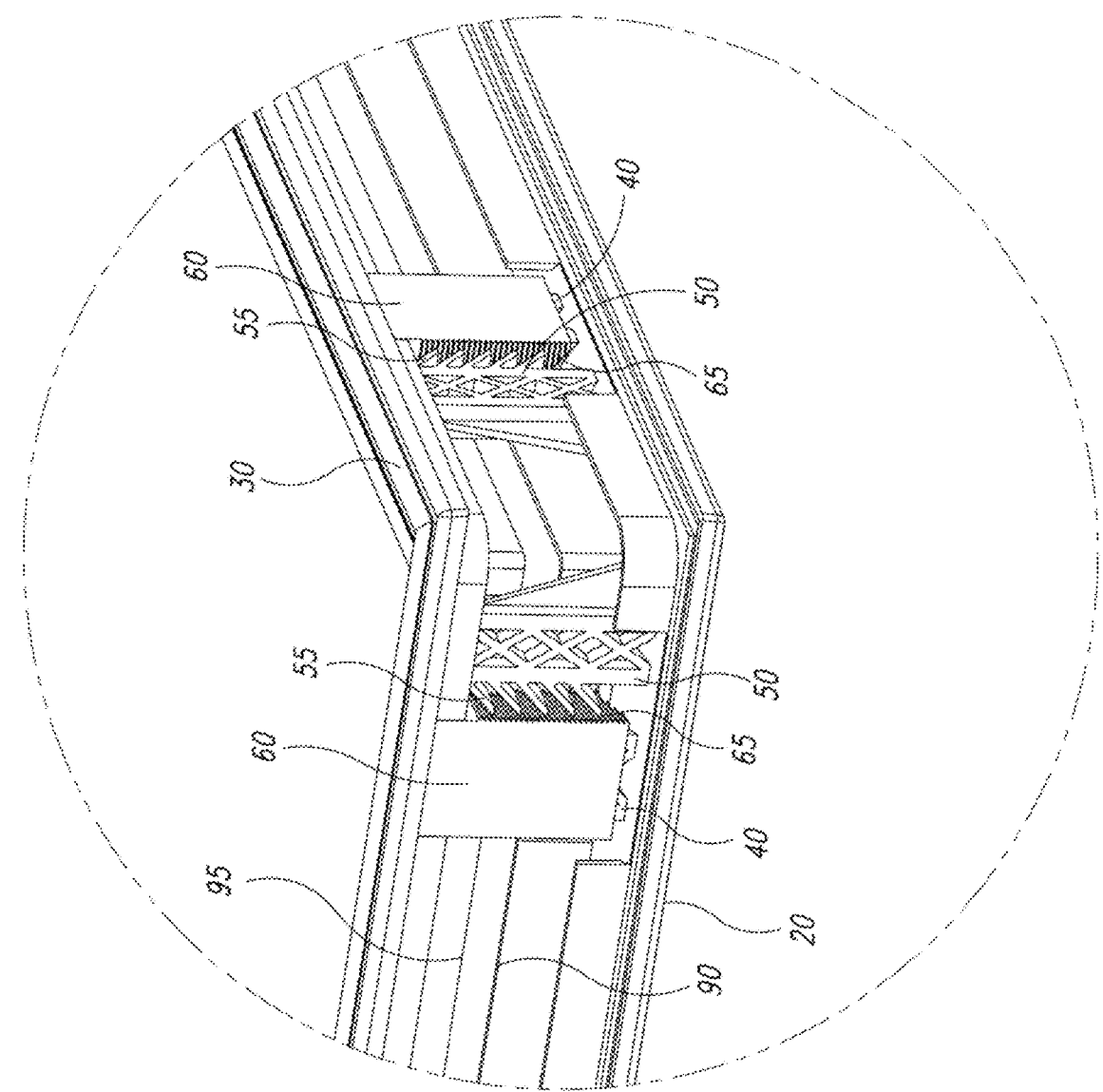

As another example, the modular frame 20 can be aligned with the modular frame 30 in a second aligned configuration such that the modular frames 20, 30 can be brought toward one another until the male alignment members 40 enter respective female alignment members 60 such that the arms 55 of each male alignment member 40 are adjacent the first side of a respective female alignment member 60, such that the teeth 65 do engage the arms 55. Such an arrangement is illustrated in FIG. 4 and in greater detail in FIG. 5, and can be referred to as a locked, installed arrangement because the modular frame 20 and the modular frame 30 are locked to one another and cannot be pulled laterally apart from one another without breaking one or more components of the frame system 10. In such an arrangement, engagement of the male and female alignment members 40, 60 can align the modular frames 20, 30 with one another, and engagement of the teeth 65 with the arms 55 can lock the modular frames 20, 30 to one another.

In some embodiments, the modular frames 20, 30 can be progressively brought toward one another and the arms 55 can progressively engage the teeth 65 to progressively lock the modular frames 20, 30 to one another. Thus, in different implementations, the modular frames 20, 30 can be locked together in the locked, installed arrangement with different distances between the modular frames 20, 30. The different distances between the modular frames 20, 30 allow glass or glazing of different thicknesses to be held in place between an inner surface 90 of the modular frame 20 and an inner surface 95 of the modular frame 30, and can likewise allow the frame system 10 to be used with doors or other structures of different thicknesses.

The frame system 10 can be configured such that the orientation of the modular frame 20 in the first aligned configuration is rotated 180° with respect to the modular frame 30 from the orientation of the modular frame 20 in the second aligned configuration. Thus, a method of installing the frame system 10 can include fabricating the individual components of the system 10, coupling the components to one another as shown in FIG. 1, shipping the frame system 10 in the unlocked, shipping arrangement to an installation location, pulling the modular frames 20, 30 laterally away from one another, and coupling the modular frames 20, 30 to one another in the locked, installed arrangement with a window between them. For example, a piece of material such as glass or glazing can be held in place between the inner surface 90 of the modular frame 20 and the inner surface 95 of the modular frame 30.

As illustrated in FIGS. 1-5, a first modular frame 20 of the system 10 can be coupled to male alignment members 40 and male interlocking members 50 but not to female alignment members 60, and a second modular frame 30 of the system 10 can be coupled to female alignment members 60 but not to male alignment members 40 or male interlocking members 50. In other embodiments, however, a first modular frame of a frame system can be coupled to one or more male alignment members 40, one or more male interlocking members 50, and one or more female alignment members 60, and a second modular frame of the frame system can be coupled to one or more male alignment members 40, one or more male interlocking members 50, and one or more female alignment members 60.

In some specific embodiments, a first modular frame of a frame system can be coupled to one or more male alignment members 40, one or more male interlocking members 50, and one or more female alignment members 60, and an identical second modular frame of the frame system can be identically coupled to one or more male alignment members 40, one or more male interlocking members 50, and one or more female alignment members 60, such that the first modular frame and the members coupled thereto are identical to the second modular frame and the members coupled thereto. In some embodiments, the positions of the male alignment members 40, male interlocking members 50, and female alignment members 60 on the first modular frame can correspond to those on the second modular frame such that the first and second modular frames can be coupled to one another in an unlocked, shipping arrangement, and in a locked, installed arrangement as described above.

As illustrated in FIGS. 1-5, a first modular frame 20 of the system 10 can be coupled to male alignment and interlocking members facing the same direction, i.e., such that the male alignment members 40 and the male interlocking members 50 alternate along each side of the modular frame 20. Similarly, the second modular frame 30 of the system 10 can be coupled to female alignment members 60 facing the same direction, i.e., such that the first side of each female alignment member 60 faces the second side of an adjacent female alignment member 60 or such that the first side of each female alignment member 60 does not face a first side of an adjacent female alignment member 60. In other embodiments, however, a first modular frame of a frame system can be coupled to male alignment and interlocking members facing in different or alternating directions. Similarly, a second modular frame of the frame system can be coupled to one or more female alignment members 60 facing in different or alternating directions. In such embodiments, the positions and orientations of the male alignment members 40, male interlocking members 50, and female alignment members 60 on the first modular frame can correspond to those on the second modular frame such that the first and second modular frames can be coupled to one another in an unlocked, shipping arrangement, and in a locked, installed arrangement as described above.

It has been found that a convenient and economical method of fabricating the components of the frame system 10 is doing so modularly. More specifically, it has been found that fabricating a single integral component that includes both of the modular frame 20 and the male alignment and interlocking member or a single integral component that includes both of the modular frame 30 and the female alignment member 60 can be unnecessarily expensive, for several reasons. First, injection molding of such integral members can use complex molds and one or more side pulls, which can increase the cost of the molds and fabrication process. Second, two separate molds are often used—one for the integral component that includes the modular frame 20 and the male alignment and interlocking member and another for the integral component that includes the modular frame 30 and the female alignment member 60—in effect doubling the cost of the already expensive molds. Third, two of such expensive molds are used for each size of door lite to be fabricated. Thus, to manufacture a 24"×36" window, a 28"×54" window, and a 34"×46" window, six expensive molds may be used. In contrast, it has been found that modular fabrication of components of door lite systems can reduce mold costs by greater than 50%, and in some cases, even up to about 75%.

In some embodiments, the modular frame 20 can be formed without the plurality of male alignment members 40 and without the plurality of male interlocking members 50, and the modular frame 30 can be formed without the plurality of female alignment members 60. The plurality of male alignment members 40, the plurality of male interlocking members 50, and the plurality of female alignment members 60 can be formed separately from the other components of the frame system 10. The plurality of male alignment members 40 and the plurality of male interlocking members 50 can then be coupled to the modular frame 20, and the plurality of female alignment members 60 can be coupled to the modular frame 30. The frame system 10 can then be shipped in the unlocked, shipping arrangement to an installation location, the modular frames 20, 30 can be pulled laterally away from one another, and the modular frames 20, 30 can then be coupled to one another in the locked, installed arrangement with a window between them.

In some cases, the modular frame 20 can be formed without the plurality of male alignment members 40 and without the plurality of male interlocking members 50 by injection molding acrylonitrile-butadiene-styrene (ABS) between no more than two opposed mold portions. In some cases, the modular frame 30 can be formed without the plurality of female alignment members 60 by injection molding acrylonitrile-butadiene-styrene (ABS) between no more than two opposed mold portions. In some cases, the plurality of male alignment members 40, the plurality of male interlocking members 50, and the plurality of female alignment members 60 can each be formed separately from the other components of the frame system 10 by injection molding acrylonitrile-butadiene-styrene (ABS) between no more than two opposed mold portions. In some cases, each male alignment member 40 can be formed integrally with a respective male interlocking member 50 but separately from the other components of the frame system 10 by injection molding acrylonitrile-butadiene-styrene (ABS) between no more than two opposed mold portions to form a male alignment and interlocking member.

Figure 8B:
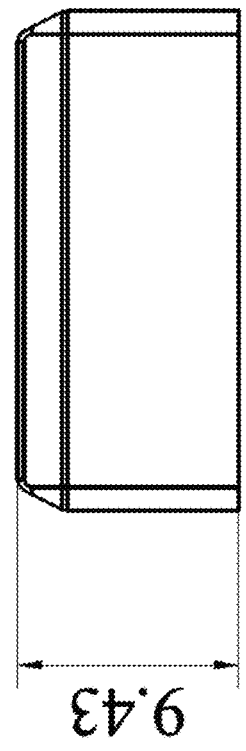
Figure 8D:
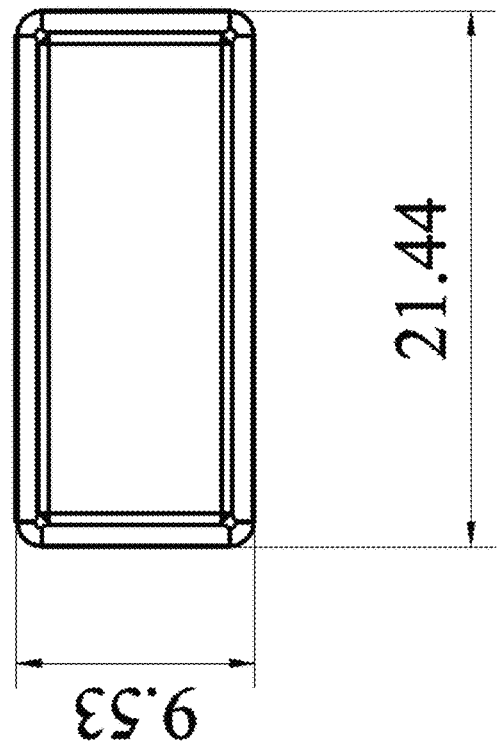
Figure 8A:
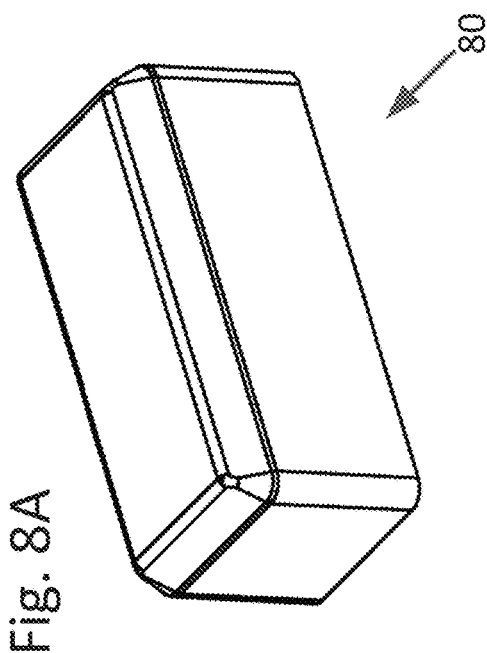
Figure 8C:
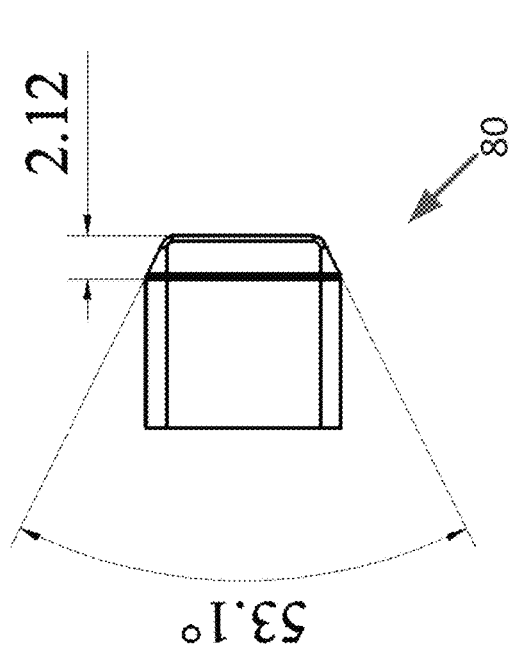

FIG. 6A illustrates a cross-sectional side view, FIG. 6B an end view, FIG. 6C a side view, FIG. 6D a top view, FIG. 6E a first perspective view, and FIG. 6F a second perspective view of one embodiment of a male alignment and interlocking member 100 including a male alignment member 42 similar to male alignment member 40 and a male interlocking member 52 similar to male interlocking member 50 that was formed separately from the other components of the frame system of which it forms a part. FIG. 7A illustrates a cross-sectional side view, FIG. 7B an end view, FIG. 7C a side view, FIG. 7D a top view, FIG. 7E a first perspective view, and FIG. 7F a second perspective view of one embodiment of a female alignment member 62 similar to female alignment member 60 that was formed separately from the other components of the frame system of which it forms a part. FIG. 8A illustrates a perspective view, FIG. 8B a side view, FIG. 8C an end view, and FIG. 8D a top view of one embodiment of a spacer element 80 that was formed separately from the other components of the frame system of which it forms a part.

The dimensions provided in FIGS. 6A-6F, 7A-7F, and 8A-8D have units of millimeters (as do the dimensions provided in all of the Figures), and are examples of dimensions that have been found to be suitable. These dimensions are not intended to limit the scope of the disclosure. As illustrated, a length of the male alignment and interlocking member 100 can be the same as the combined length of the female alignment member 62 and the spacer element 80, such that the male alignment and interlocking member 100 can be mounted interchangeably with the combination of a female alignment member 62 and a spacer element 80 to another portion of a frame system such as a recess of a modular frame.

Figure 10:
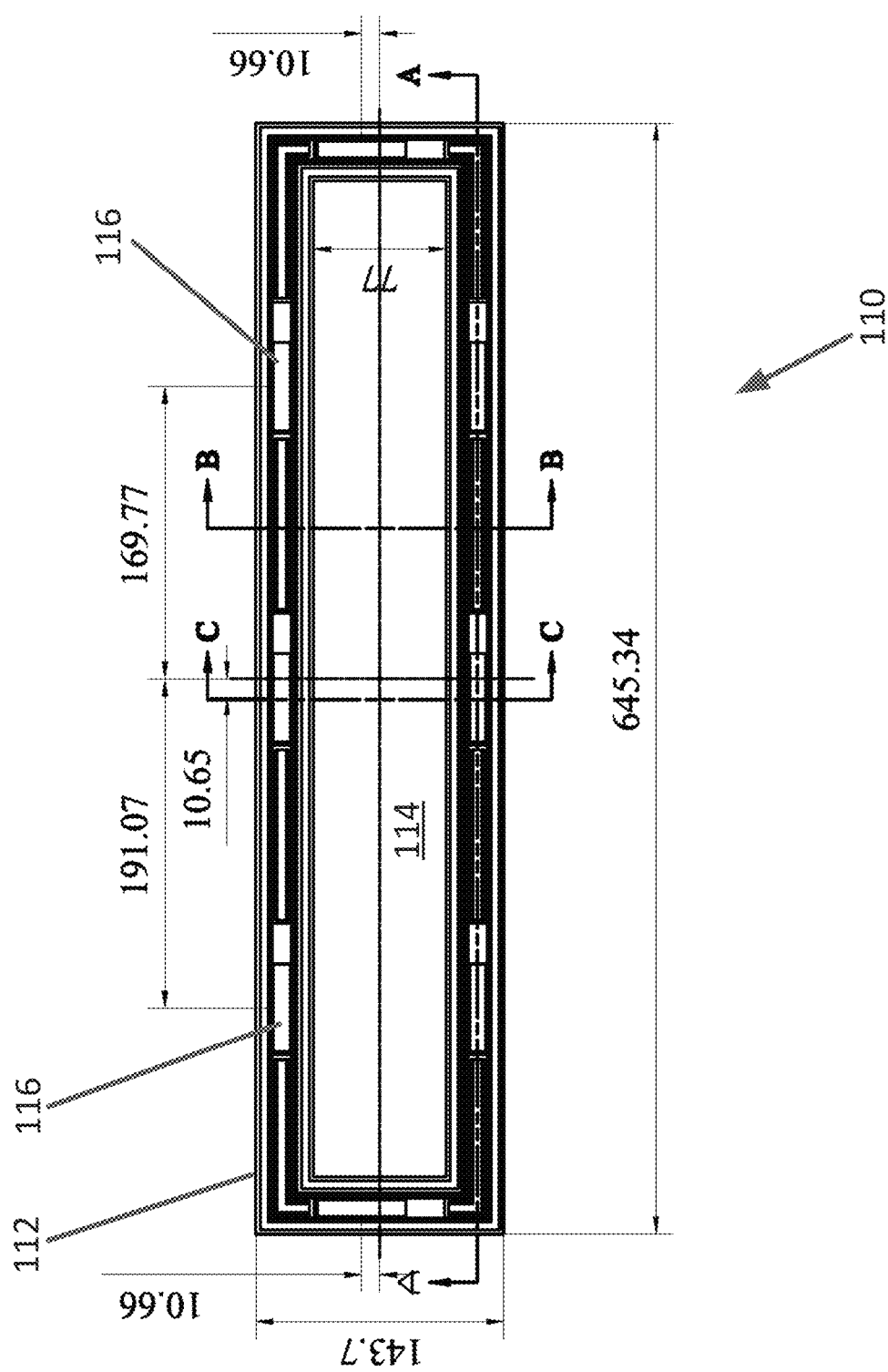
Figure 15:
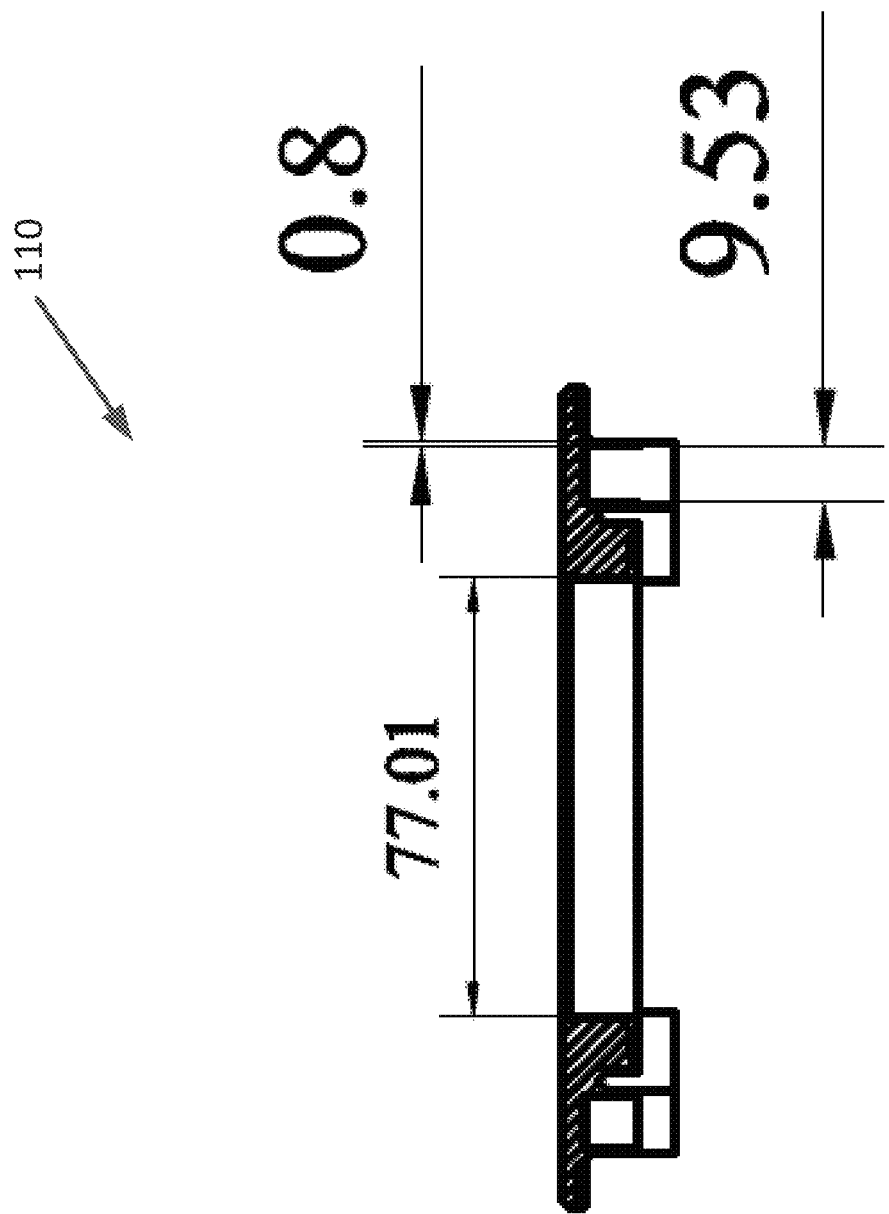

FIG. 9 illustrates a perspective view, FIG. 10 a top view, FIG. 11 a side view, FIG. 12 a cross-sectional side view taken along line A-A shown in FIG. 10, FIG. 13 an end view, FIG. 14 a first cross-sectional end view taken along line B-B shown in FIG. 10, and FIG. 15 a second cross-sectional end view taken along line C-C shown in FIG. 10 of a first embodiment of a modular frame 110 formed separately from the other components of the frame system of which it forms a part. Modular frame 110 can be similar to modular frame 20 or modular frame 30. In some cases, the modular frame 110 can be formed by injection molding acrylonitrile-butadiene-styrene (ABS) between no more than two opposed mold portions.

The modular frame 110 includes a rectangular frame 112 with a central rectangular opening 114. The rectangular frame 112 includes a plurality of recesses 116 which can form seats into which a male alignment and interlocking member similar to male alignment and interlocking member 100, a female alignment member similar to female alignment member 60, and/or a spacer element similar to spacer element 80 can be mounted. In some cases, a first modular frame 110 can be coupled to a plurality of such male alignment and interlocking members (i.e., the male alignment and interlocking members can be mounted within the recesses 116 of the first modular frame 110) and a second modular frame 110 can be coupled to a plurality of such female alignment members and respective spacer elements (i.e., the female alignment members and respective spacer elements can be mounted within the recesses 116 of the second modular frame 110). The first and second modular frames 110, coupled to such components, can form a door lite frame system similar to door lite frame system 10.

The modular frame 110 is illustrated having certain dimensions, and the modular frame 110 can have various alternative dimensions. In some cases, the modular frame 110 can have a larger overall length or width, so as to form a part of a larger door lite system, while other dimensions of the modular frame 110 remain the same as those illustrated. In other cases, the modular frame 110 can have a smaller overall length or width, so as to form a part of a smaller door lite system, while other dimensions of the modular frame 110 remain the same as those illustrated. In either case, a male alignment member, a male interlocking member, a male alignment and interlocking member, a female alignment member, and/or a spacer element can be coupled to the modular frame 110 regardless of its overall length and width.

Figure 16:
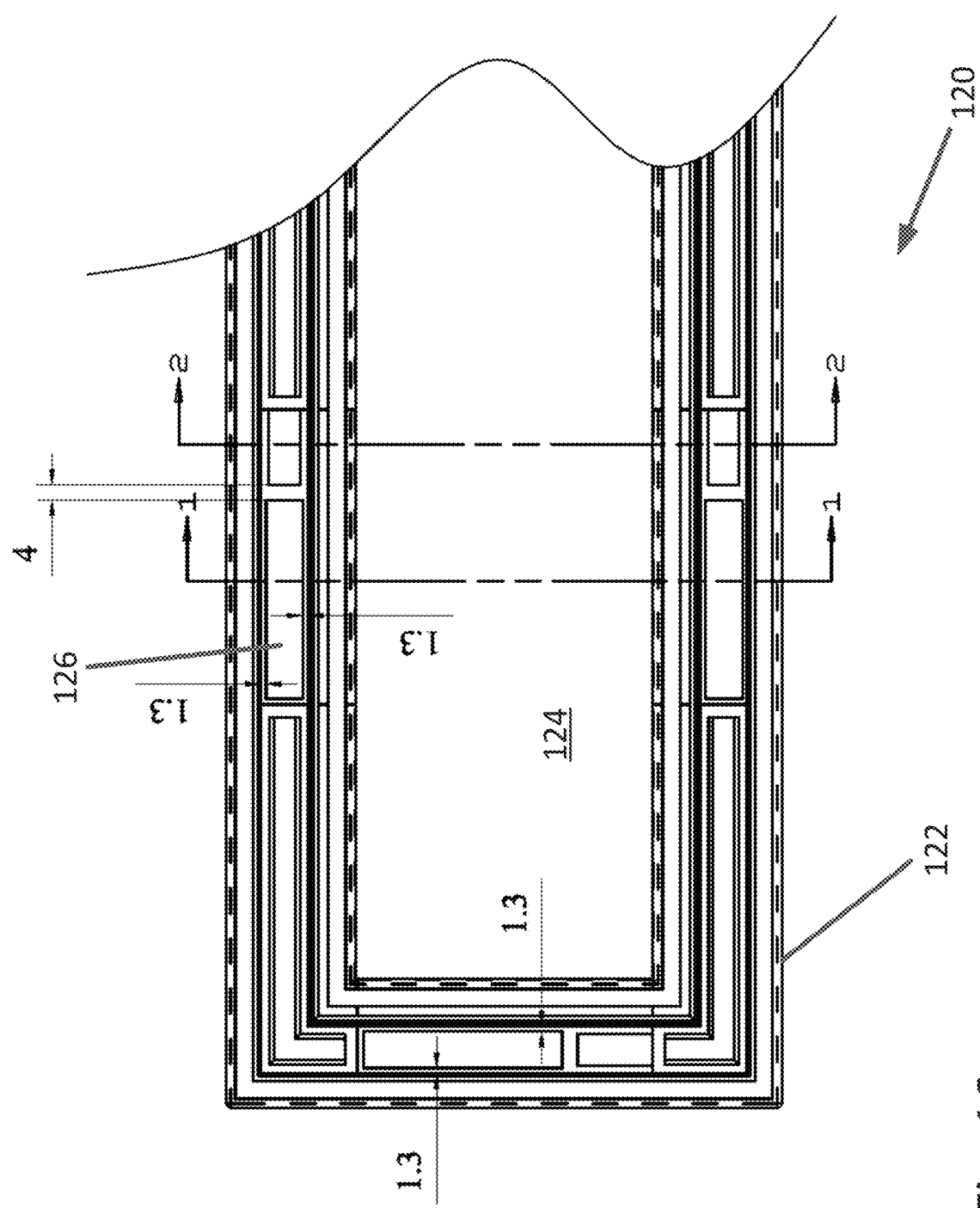

FIG. 16 illustrates a portion of a top view, FIG. 17 a first cross-sectional end view taken along line 1-1 shown in FIG. 16, and FIG. 18 a second cross-sectional end view taken along line 2-2 shown in FIG. 16 of a second embodiment of a modular frame 120 formed separately from the other components of the frame system of which it forms a part. The modular frame 120 can be similar to modular frame 20 or modular frame 30. In some cases, the modular frame 120 can be formed by injection molding acrylonitrile-butadiene-styrene (ABS) between no more than two opposed mold portions.

The modular frame 120 includes a rectangular frame 122 with a central rectangular opening 124. The rectangular frame 122 includes a plurality of recesses 126 which can form seats into which a male alignment and interlocking member similar to male alignment and interlocking member 100, a female alignment member similar to female alignment member 60, and/or a spacer element similar to spacer element 80 can be mounted. In some cases, a first modular frame 120 can be coupled to a plurality of such male alignment and interlocking members (i.e., the male alignment and interlocking members can be mounted within the recesses 126 of the first modular frame 120) and a second modular frame 120 can be coupled to a plurality of such female alignment members and respective spacer elements (i.e., the female alignment members and respective spacer elements can be mounted within the recesses 126 of the second modular frame 120). The first and second modular frames 120, coupled to such components, can form a door lite frame system similar to door lite frame system 10.

The modular frame 120 is illustrated having certain dimensions, and the modular frame 120 can have various alternative dimensions. In some cases, the modular frame 120 can have a larger overall length or width, so as to form a part of a larger door lite system, while other dimensions of the modular frame 120 remain the same as those illustrated. In other cases, the modular frame 120 can have a smaller overall length or width, so as to form a part of a smaller door lite system, while other dimensions of the modular frame 120 remain the same as those illustrated. In either case, a male alignment member, a male interlocking member, a male alignment and interlocking member, a female alignment member, and/or a spacer element can be coupled to the modular frame 120 regardless of its overall length and width.

Figure 19:
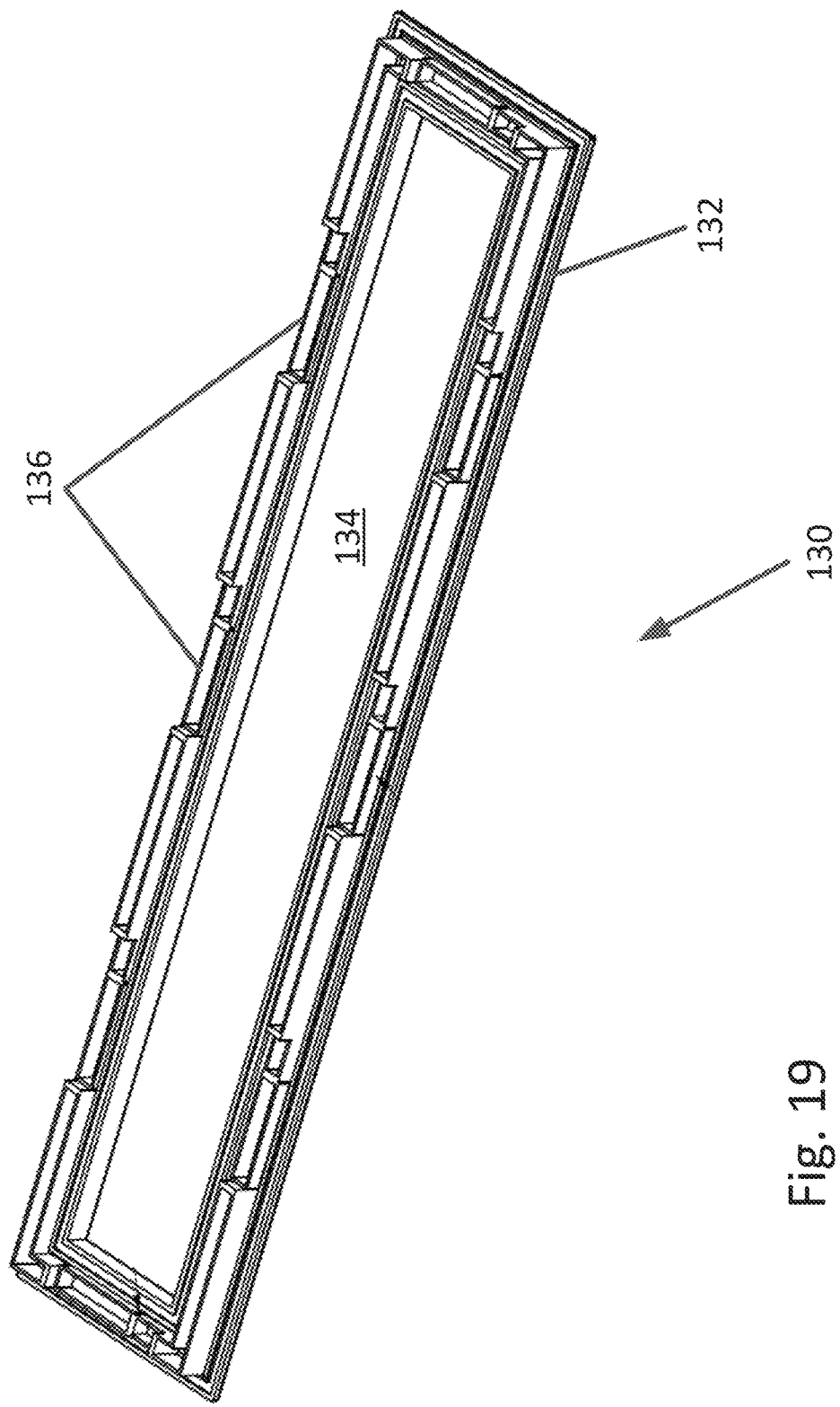
Figure 20:
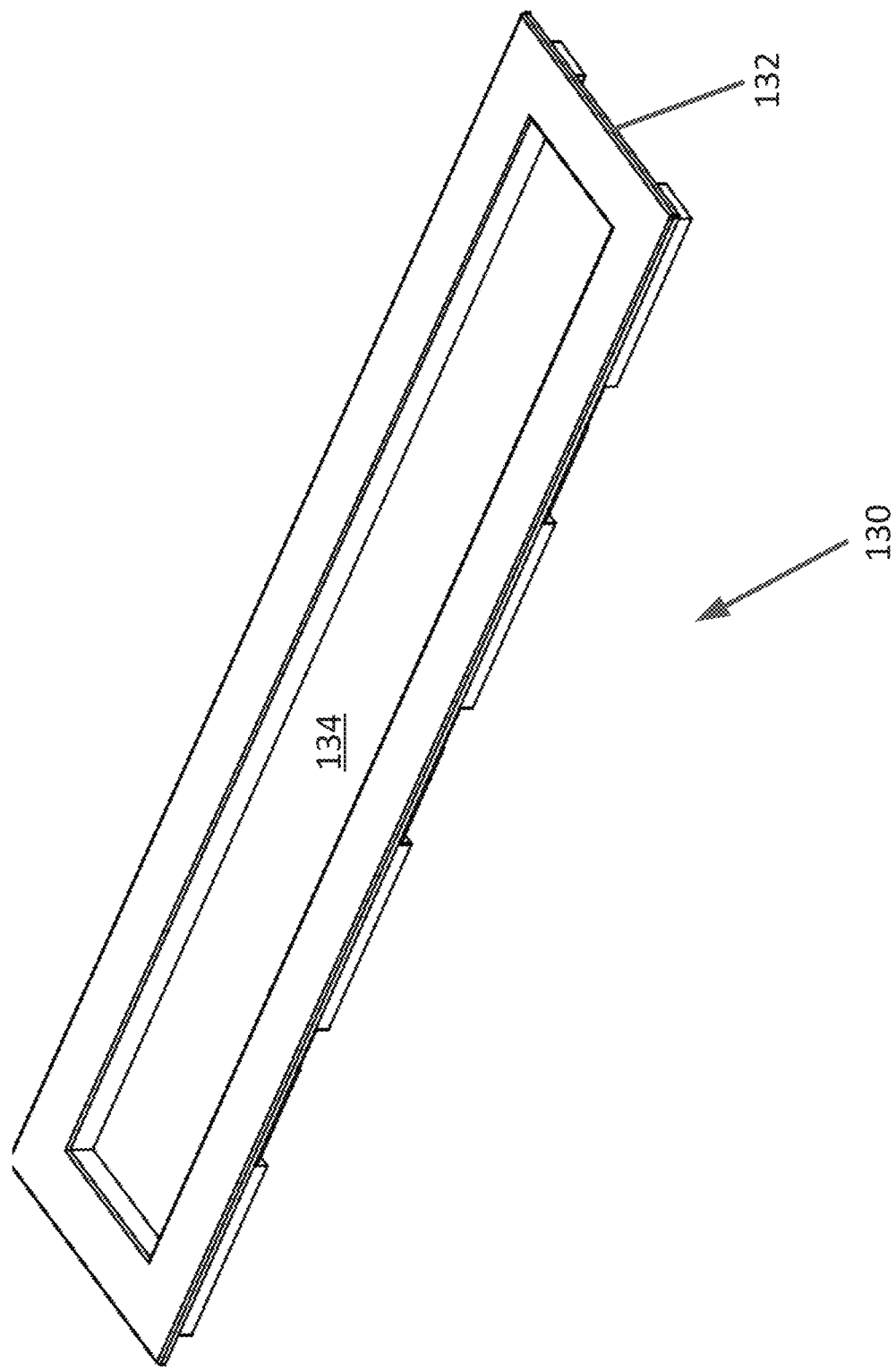
Figure 21:
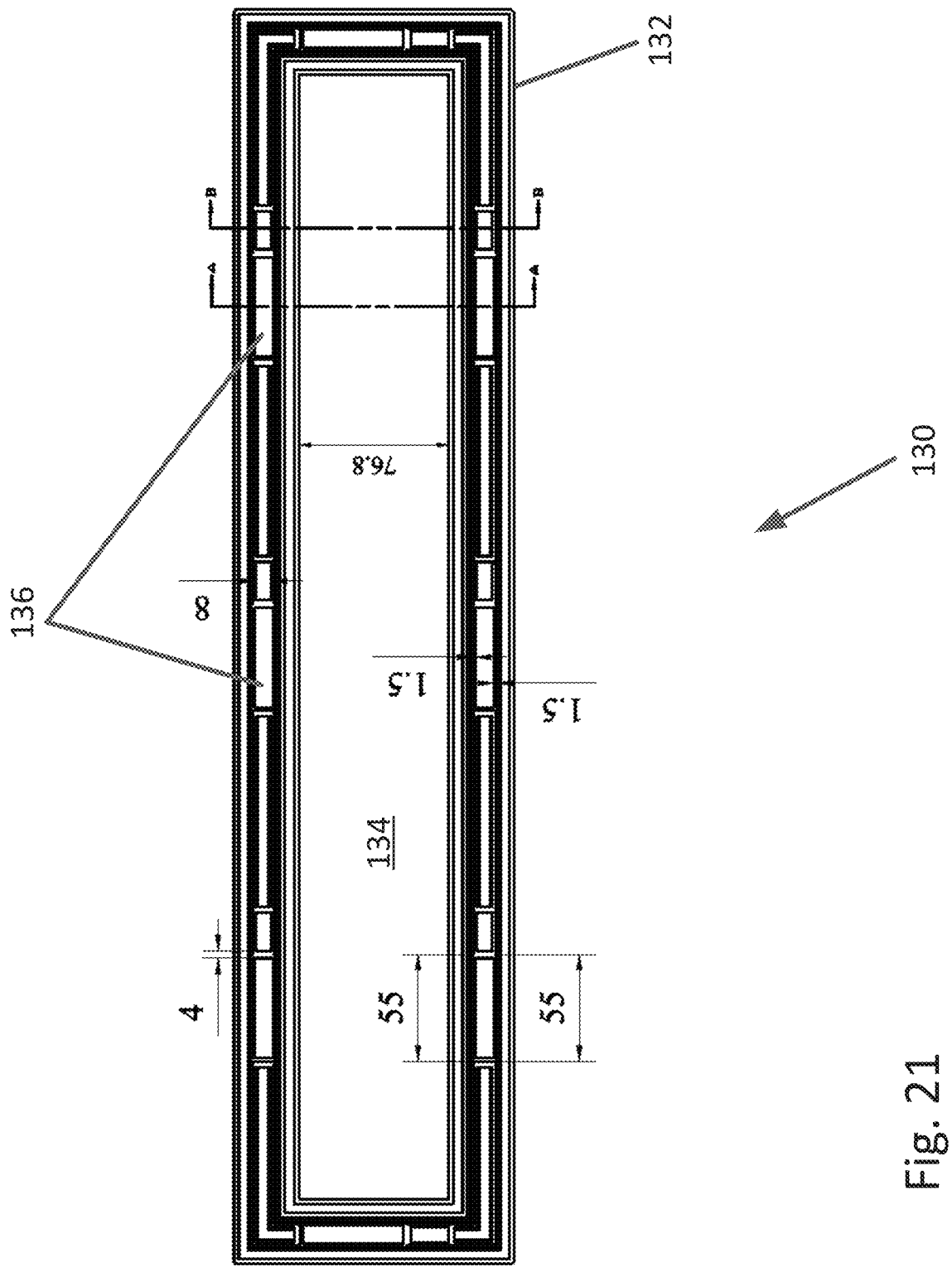

FIG. 19 illustrates a top perspective view, FIG. 20 a bottom perspective view, FIG. 21 a top view, FIG. 22 a cross-sectional end view taken along line A-A shown in FIG. 21, and FIG. 23 a cross-sectional end view taken along line B-B shown in FIG. 21 of a third embodiment of a modular frame 130 formed separately from the other components of the frame system of which it forms a part. Modular frame 130 can be similar to modular frame 20 or modular frame 30. In some cases, the modular frame 130 can be formed by injection molding acrylonitrile-butadiene-styrene (ABS) between no more than two opposed mold portions.

The modular frame 130 includes a rectangular frame 132 with a central rectangular opening 134. The rectangular frame 132 includes a plurality of recesses 136 which can form seats into which a male alignment and interlocking member similar to male alignment and interlocking member 100, a female alignment member similar to female alignment member 60, and/or a spacer element similar to spacer element 80 can be mounted. In some cases, a first modular frame 130 can be coupled to a plurality of such male alignment and interlocking members (i.e., the male alignment and interlocking members can be mounted within the recesses 136 of the first modular frame 130) and a second modular frame 130 can be coupled to a plurality of such female alignment members and respective spacer elements (i.e., the female alignment members and respective spacer elements can be mounted within the recesses 136 of the second modular frame 130). The first and second modular frames 130, coupled to such components, can form a door lite frame system similar to door lite frame system 10.

The modular frame 130 is illustrated having certain dimensions, and the modular frame 130 can have various alternative dimensions. In some cases, the modular frame 130 can have a larger overall length or width, so as to form a part of a larger door lite system, while other dimensions of the modular frame 130 remain the same as those illustrated. In other cases, the modular frame 130 can have a smaller overall length or width, so as to form a part of a smaller door lite system, while other dimensions of the modular frame 130 remain the same as those illustrated. In either case, a male alignment member, a male interlocking member, a male alignment and interlocking member, a female alignment member, and/or a spacer element can be coupled to the modular frame 130 regardless of its overall length and width.

FIG. 24 illustrates a portion of a top view, FIG. 25 a first cross-sectional end view taken along line A-A shown in FIG. 24, and FIG. 26 a larger view of a portion of FIG. 25 of a fourth embodiment of a modular frame 140 formed separately from the other components of the frame system of which it forms a part. Modular frame 140 can be similar to modular frame 20 or modular frame 30. In some cases, the modular frame 140 can be formed by injection molding acrylonitrile-butadiene-styrene (ABS) between no more than two opposed mold portions.

The modular frame 140 includes a rectangular frame 142 with a central rectangular opening 144. The rectangular frame 142 includes a plurality of recesses 146 which can form seats into which a male alignment and interlocking member similar to male alignment and interlocking member 100, a female alignment member similar to female alignment member 60, and/or a spacer element similar to spacer element 80 can be mounted. In some cases, a first modular frame 140 can be coupled to a plurality of such male alignment and interlocking members (i.e., the male alignment and interlocking members can be mounted within the recesses 146 of the first modular frame 140) and a second modular frame 140 can be coupled to a plurality of such female alignment members and respective spacer elements (i.e., the female alignment members and respective spacer elements can be mounted within the recesses 146 of the second modular frame 140). The first and second modular frames 140, coupled to such components, can form a door lite frame system similar to door lite frame system 10.

The modular frame 140 is illustrated having certain dimensions, and the modular frame 140 can have various alternative dimensions. In some cases, the modular frame 140 can have a larger overall length or width, so as to form a part of a larger door lite system, while other dimensions of the modular frame 140 remain the same as those illustrated. In other cases, the modular frame 140 can have a smaller overall length or width, so as to form a part of a smaller door lite system, while other dimensions of the modular frame 140 remain the same as those illustrated. In either case, a male alignment member, a male interlocking member, a male alignment and interlocking member, a female alignment member, and/or a spacer element can be coupled to the modular frame 140 regardless of its overall length and width.

Figure 31:
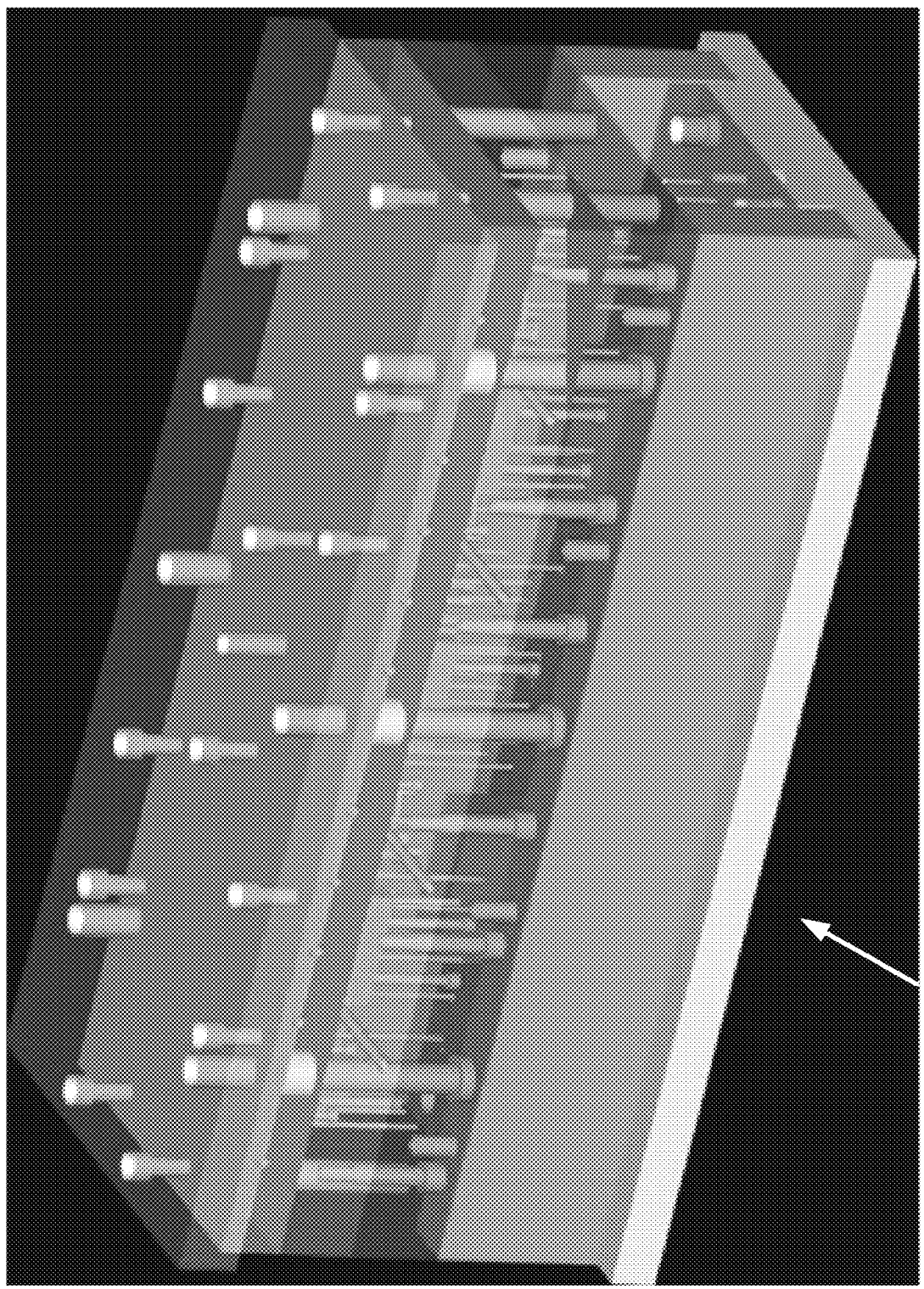
Figure 32:
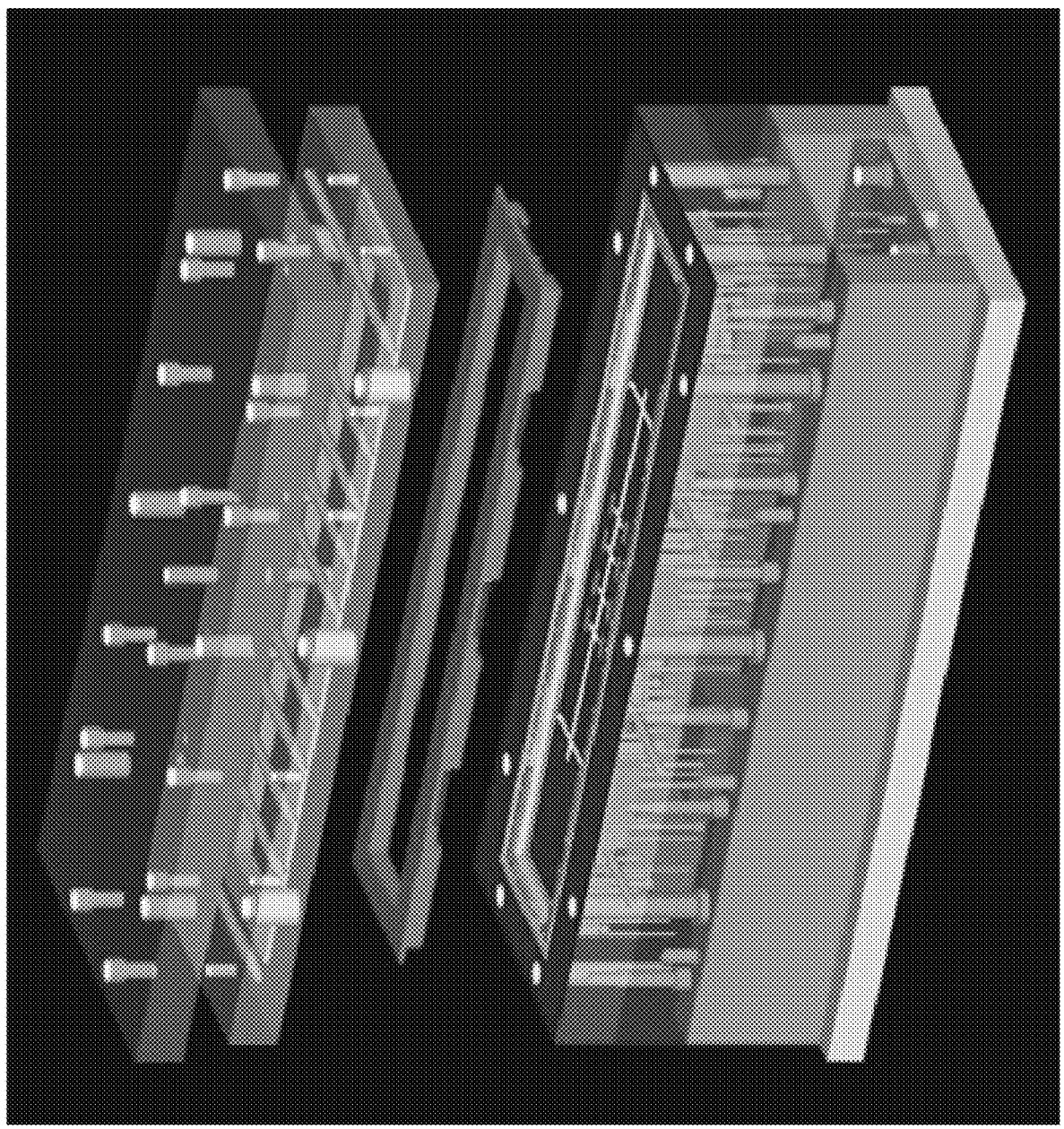

FIG. 27 illustrates a top view, FIG. 28 a cross-sectional side view along line A-A shown in FIG. 27, FIG. 29 a cross-sectional end view along line B-B shown in FIG. 27, and FIG. 30 an end view of a mold system 150 for forming a modular frame for use in a door lite frame system. The modular frame can be formed between a first, bottom mold plate 152 and a second, top mold plate 154 opposed to the first mold plate 152, such as within a void or cavity 156 defined between the mold plates 152, 154. FIG. 31 illustrates a three-dimensional representation of the mold system 150, and FIG. 32 illustrates an exploded three-dimensional representation of the mold system 150. In some cases, the first mold plate 152 or the second mold plate 154 can have surface patterns formed thereon such that the modular frame formed in the mold system 150 has corresponding surface patterns.

Figure 33:
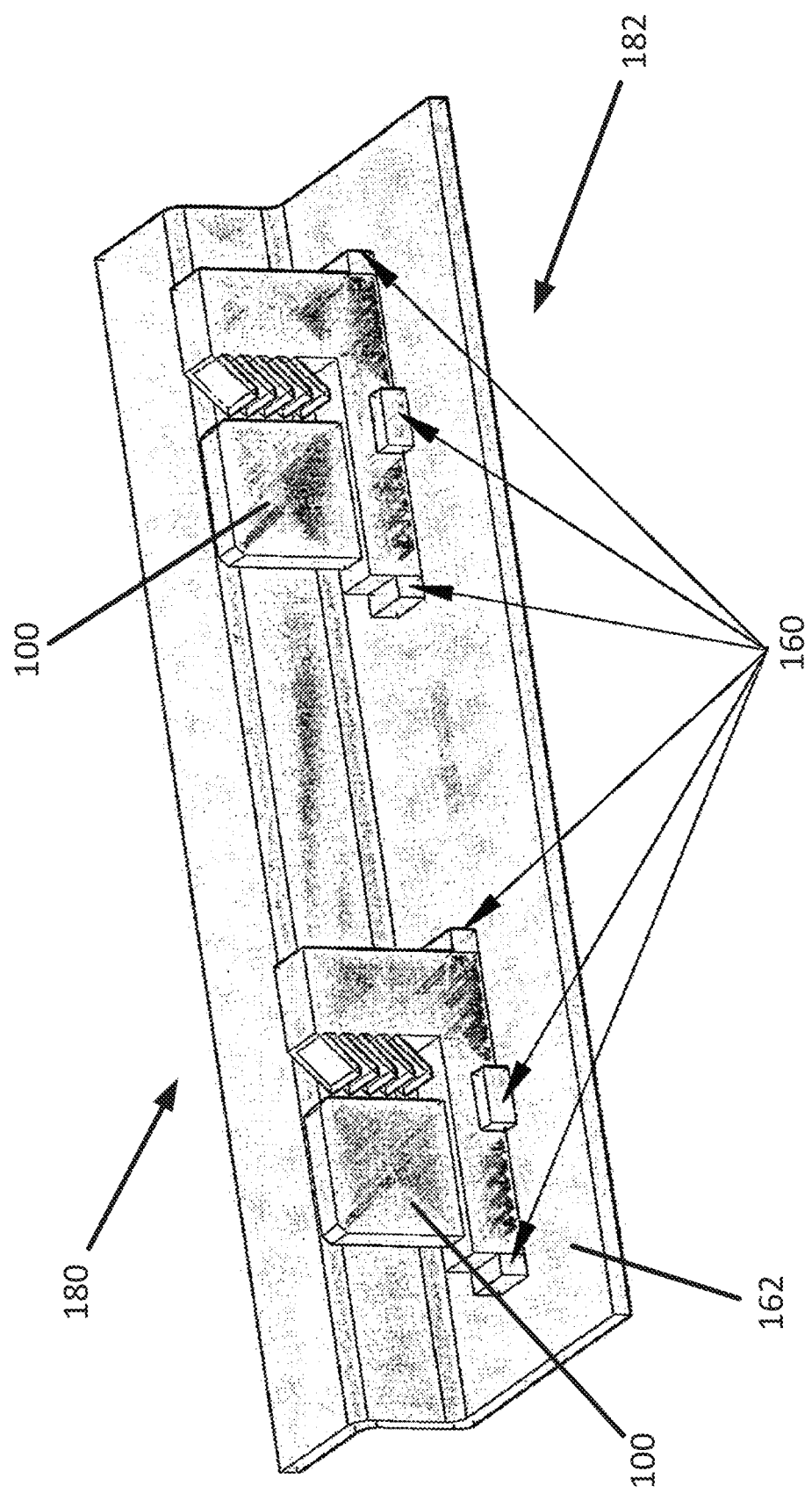
FIGS. 33-35 illustrate coupling components of a door lite frame system to a modular frame of the door lite frame system according to at least one illustrated embodiment.
Figure 34:
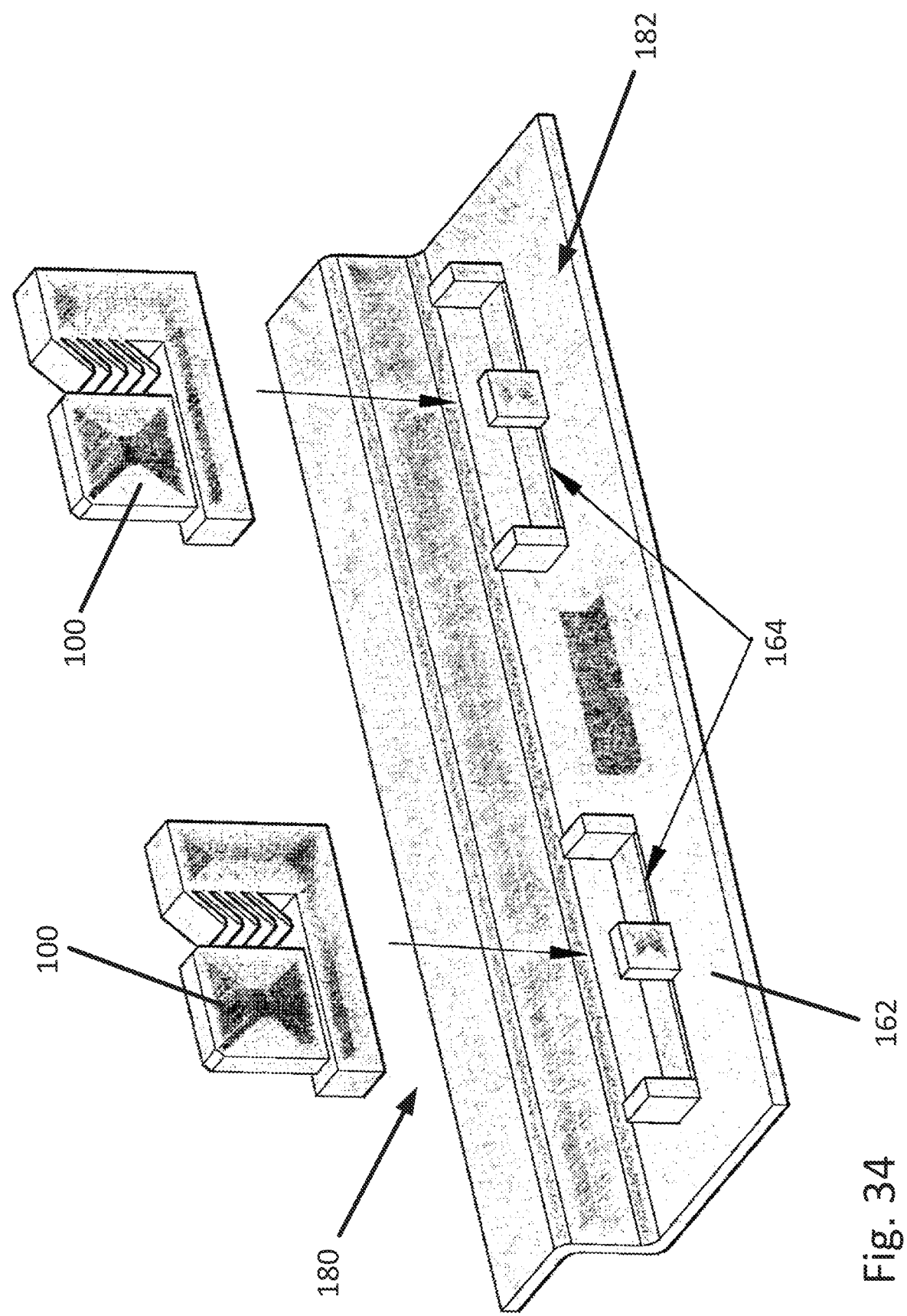

FIG. 33 illustrates that a modular frame 180 similar to one of modular frames 110, 120, 130, or 140 can include a plurality of locator tabs 160 positioned within its recess 182, similar to one of the recesses 116, 126, 136, or 146. The locator tabs 160 can protrude outward from a surface 162 of the modular frame 180 to which other components will be mounted. The locator tabs 160 can be positioned within the recess 182 to guide a male alignment and interlocking member or a female alignment member and a spacer element into a desired location within the recess 182. FIG. 34 illustrates that the locator tabs 160 can be used in combination with an adhesive such as an ABS structural adhesive 164. In some cases, the ABS structural adhesive 164 can be used without the locator tabs 160. In some cases, the ABS structural adhesive 164 can provide a bond that is at least as strong as, or stronger than, solid ABS material.

Figure 35:
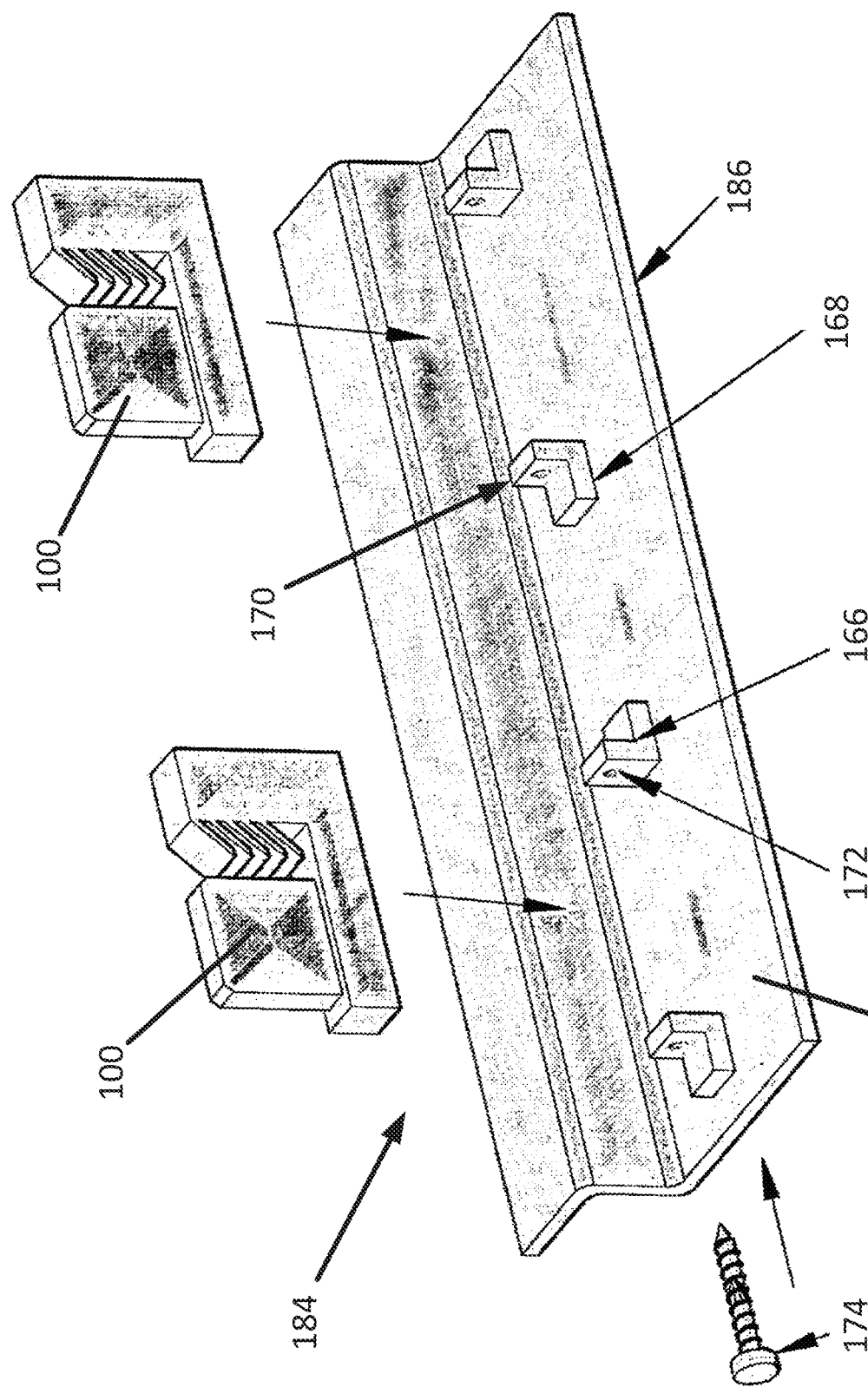

FIG. 35 illustrates that a modular frame 184 similar to one of modular frames 110, 120, 130, or 140 can include a plurality of angle elements 166 such as steel angles positioned within its recess 186, similar to one of the recesses 116, 126, 136, or 146. The angle elements 166 can include a bottom leg portion 168 and a top leg portion 170 coupled to the bottom leg portion 168 at a 90° angle. The angle elements 166 can be formed integrally with the modular frame 184 or can be formed separately from the modular frame 184 and coupled thereto, such as with an adhesive positioned between the bottom leg portions 168 and the modular frame 184. Each top leg portion 170 can function in a manner similar to the locator tabs 160, as described above, and can also include a hole 172 for receiving a fastener such as a screw 174. Once components, such as a male alignment and interlocking member, are seated within the recess 186 between two top leg portions 170, screws 174 can be screwed through the top leg portions 170 and into the components to secure them to the modular frame 184. The angle elements 166 can be used in combination with an adhesive such as an ABS structural adhesive, as shown in FIG. 34, or without such an adhesive. In some cases, the angle elements 166 and screws 174 can provide a bond that is at least as strong as, or stronger than, solid ABS material.

In some cases, modular door lite components in accordance with the above description can be provided in systems or kits. For example, a system of modular door lite components can include two modular frames similar to modular frames 20, 30, 110, 120, 130, and/or 140, a male alignment and interlocking member similar to male alignment and interlocking member 100, a female alignment member similar to female alignment member 60, and a spacer element similar to spacer element 80. A door lite system can be assembled from these components.

As another example, a system of modular door lite components can include two modular frames each having a first width and a first length, two modular frames each having a second width and a second length, two male alignment and interlocking members having the same dimensions as one another, two female alignment members having the same dimensions as one another, and two spacer elements having the same dimensions as one another. The first width can be larger or smaller than the second width, and the first length can be larger or smaller than the second length. Two door lite systems having different overall dimensions can be assembled from these components.

The modular door lite components described herein can be used to assemble door lites at less expense than previous door lite systems. The reduced expense can be attributed to at least the modular nature of the components and to reduced manufacturing costs associated with the elimination of side pulls and the use of no more than two opposed mold portions to form the components. The methods, systems, and devices described herein can be used to turn metal frames into energy efficient (thermal break) snap frames.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. patent application Ser. No. 14/643,861, filed Mar. 10, 2015, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mold system for casting door lite frame system components comprising:
a first mold including a first top mold portion and a first bottom mold portion, the first top mold portion and the first bottom mold portion defining a first cavity for casting a first modular frame having a first length, a first width, and a first recess having first recess dimensions;
a second mold including a second top mold portion and a second bottom mold portion, the second top mold portion and the second bottom mold portion defining a second cavity for casting a second modular frame having a second length larger than the first length, a second width larger than the first width, and a second recess having second recess dimensions, the second recess dimensions being the same as the first recess dimensions;
a third mold including a third top mold portion and a third bottom mold portion, the third top mold portion and the third bottom mold portion defining a third cavity for casting a male alignment member having male alignment member dimensions such that the male alignment member can be seated within the first recess and can be seated within the second recess; and
a fourth mold including a fourth top mold portion and a fourth bottom mold portion, the fourth top mold portion and the fourth bottom mold portion defining a fourth cavity for casting a female alignment member having female alignment member dimensions such that the female alignment member can be seated within the first recess and can be seated within the second recess.

2. The system of claim 1, wherein:
the third top mold portion and the third bottom mold portion define the third cavity for casting a male interlocking member having a plurality of arms extending therefrom; and
the fourth top mold portion and the fourth bottom mold portion define the fourth cavity for casting the female alignment member including a plurality of teeth to engage with the plurality of arms.

* * * * *